United States Patent
Lozada et al.

(10) Patent No.: US 10,651,490 B2
(45) Date of Patent: May 12, 2020

(54) PROTON CONDUCTING MEMBRANE COMPRISING MONOLITHIC 2D MATERIAL AND IONOMER, A PROCESS FOR PREPARING SAME AND USE OF SAME IN FUEL CELL AND HYDROGEN GAS SENSOR

(71) Applicant: The University of Manchester, Manchester (GB)

(72) Inventors: Marcelo Lozada, Manchester (GB); Andre K. Geim, Manchester (GB)

(73) Assignee: The University of Manchester, Manchester (GB)

( * ) Notice: Subject to any disclaimer, the term of this patent is extended or adjusted under 35 U.S.C. 154(b) by 96 days.

(21) Appl. No.: 15/511,560

(22) PCT Filed: Sep. 15, 2015

(86) PCT No.: PCT/GB2015/052663
§ 371 (c)(1),
(2) Date: Mar. 15, 2017

(87) PCT Pub. No.: WO2016/042309
PCT Pub. Date: Mar. 24, 2016

(65) Prior Publication Data
US 2017/0263966 A1 Sep. 14, 2017

(30) Foreign Application Priority Data
Sep. 18, 2014 (GB) .................. 1416527.8

(51) Int. Cl.
| | |
|---|---|
| *H01M 8/1039* | (2016.01) |
| *G01N 27/407* | (2006.01) |
| *H01M 8/1032* | (2016.01) |
| *H01M 8/1041* | (2016.01) |
| *H01M 8/1067* | (2016.01) |
| *H01M 8/1069* | (2016.01) |
| *H01M 8/1011* | (2016.01) |
| *H01M 8/1023* | (2016.01) |
| *B01D 53/22* | (2006.01) |
| *B01D 71/02* | (2006.01) |
| *H01M 8/1018* | (2016.01) |
| *H01M 8/1051* | (2016.01) |
| *H01M 4/88* | (2006.01) |
| *H01M 4/90* | (2006.01) |
| *H01M 4/92* | (2006.01) |
| *B82Y 30/00* | (2011.01) |

(52) U.S. Cl.
CPC ........ *H01M 8/1039* (2013.01); *B01D 53/228* (2013.01); *B01D 71/021* (2013.01); *G01N 27/4074* (2013.01); *H01M 8/1011* (2013.01); *H01M 8/1023* (2013.01); *H01M 8/1032* (2013.01); *H01M 8/1055* (2013.01); *H01M 8/1067* (2013.01); *H01M 8/1069* (2013.01); *B82Y 30/00* (2013.01); *H01M 4/881* (2013.01); *H01M 4/90* (2013.01); *H01M 4/92* (2013.01); *H01M 8/1051* (2013.01); *H01M 2008/1095* (2013.01); *H01M 2300/0082* (2013.01); *H01M 2300/0094* (2013.01); *Y02E 60/523* (2013.01); *Y02P 70/56* (2015.11)

(58) Field of Classification Search
CPC .................................................. H01M 4/881
See application file for complete search history.

(56) References Cited

U.S. PATENT DOCUMENTS

2015/0267317 A1* 9/2015 Guo .......................... C25F 3/02
205/640

FOREIGN PATENT DOCUMENTS

| | | |
|---|---|---|
| CN | 103337649 A | 10/2013 |
| CN | 103367773 A | 10/2013 |
| EP | 3328525 A2 | 6/2018 |
| JP | 2009-524567 A | 7/2009 |
| JP | 2010-527903 A | 8/2010 |
| JP | 2010-195987 | 9/2010 |
| WO | WO-2007/061945 | 5/2007 |
| WO | WO-2008/148956 | 12/2008 |
| WO | WO-2014/009721 A1 | 1/2014 |
| WO | WO-2016/042309 A1 | 3/2016 |
| WO | WO-2017/017433 A2 | 2/2017 |

OTHER PUBLICATIONS

Arico, A. S., et al., "Influence of the acid-base characteristics of inorganic fillers on the high temperature performance of composite membranes in direct methanol fuel cells," Solid State Ionics, vol. 161, Issues 3-4, pp. 251-265 (Aug. 1, 2003).

(Continued)

*Primary Examiner* — Ladan Mohaddes
(74) *Attorney, Agent, or Firm* — Wilmer Cutler Pickering Hale and Dorr LLP

(57) ABSTRACT

The present invention relates to a graphene-based or other 2-D material membrane which allows the passage of protons and deuterons and to a method of facilitating proton or deuteron permeation through such a membrane. Monocrystalline membranes made from mono- and few-layers of graphene, hBN, molybdenum disulfide (MoS2), and tungsten disulfide (WS2) etc. are disclosed. In effect, the protons or deuterons are charge carriers that pass through the graphene or other 2-D material membrane. This process can be contrasted with the passage of gaseous hydrogen. Hydrogen is an uncharged gaseous species which is diatomic. In other words, the gas is in molecular form when considering the normal barrier properties whereas in the case of the present invention, the species which is being transported through the membrane is a charged ion comprising a single atom. Membranes of the invention find use in a number of applications such as fuel cells.

15 Claims, 14 Drawing Sheets

(56) References Cited

OTHER PUBLICATIONS

Berry, Vikas, "Impermeability of graphene and its applications," Carbon, vol. 62, pp. 1-10 (Jun. 3, 2013).
Bunch, J. S., et al., "Impermeable Atomic Membranes from Graphene Sheets," Nano Letters, vol. 8, No. 8, pp. 2458-2462 (Jul. 17, 2008).
Hu, S., et al., "Proton transport through one-atom-thick crystals," Nature, vol. 516, No. 7530, pp. 227-230 (Dec. 11, 2014).
International Search Report and Written Opinion issued by the European Patent Office as International Searching Authority dated Nov. 13, 2015, in the International Application No. PCT/GB2015/052663 (17 pages).
Koening, S. P., et al., "Selective molecular sieving through porous graphene," Nature Nanotechnology, vol. 7, pp. 728-732 (Nov. 2012).
Korotcenkov, Ghenadii, "Chapter 15—Materials for Electrochemical Gas Sensors with Liquid and Polymer electrolytes," Handbook of Gas Sensor Materials: Properties, Advantages and Shortcomings for Applications vol. 1: Conventional Approaches, pp. 353-364 (Jan. 1, 2013).
Leenaerts, O., et al., "Graphene: A perfect nanoballoon," Applied Physics Letters, vol. 93, Issue 19, pp. 193107-1-193107-3, 4 pages (Nov. 12, 2008).
Liu, M., et al., "Graphene-Supported Nanoelectrocatalysts for Fuel Cells: Synthesis, Properties, and Applications," Chemical Reviews, vol. 114, No. 10, pp. 5117-5160 (Mar. 25, 2014).
Miao, M., et al., "First principles study of the permeability of graphene to hydrogen atoms," Phys. Chem. Chem. Phys., vol. 15, Issue 38, pp. 16132-16137 (Oct. 14, 2013).
Murphy, D. W., et al., "A New Route to Metal Hydrides," Chem. Mater., vol. 5, No. 6, pp. 767-769, Jun. 1, 1993.
Nair, R. R., et al., "Unimpeded Permeation of Water Through Helium-Leak-Tight Graphene-Based Membranes," Science, vol. 335, Issue 6067, pp. 442-444, Jan. 27, 2012.
Schultz, T., et al., "Current Status of and Recent Developments in the Direct Methanol Fuel Cell," Chem. Eng. Technol., vol. 24, pp. 1223-1233, Dec. 11, 2001.
Tsetseris, L. and Pantelides, S. T., "Graphene: An impermeable or selectively permeable membrane for atomic species?," Carbon, vol. 67, pp. 58-63, Oct. 1, 2013.
United Kingdom Office Action issued by the Intellectual Property Office of the United Kingdom for Application No. GB1416527.8 dated Jun. 9, 2015, 4 pages.
VandeVondele, J., et al., "QUICKSTEP: Fast and accurate density functional calculations using a mixed Gaussian and plane waves approach," Computer Physics Communications, vol. 167, Issue 2, pp. 103-128, Apr. 15, 2005.
Wang, W. L. and Kaxiras, E., "Graphen hydrate: theoretical predication of a new insulating form of graphene," New Journal of Physics, vol. 12, 125012, pp. 1-7, 8 pages, Dec. 13, 2010.
Nam et al., "Perfluorosulfonic acid-functionalized Pt/graphene as a high-performance oxygen reduction reaction catalyst for proton exchange membrane fuel cells," Journal of Solid State Electrochemistry, published online Oct. 31, 2012, vol. 17, issue 3, pp. 767-774.
Yun et al., "Porous graphene/carbon nanotube composite cathode for proton exchange membrane fuel cell," Synthetic Metals, published online Oct. 11, 2011, vol. 161, pp. 2460-2465.
Geim et al., "Van der Waals heterostructures," Nature, Jul. 25, 2013, vol. 499, pp. 419-425.

\* cited by examiner

PROTON CONDUCTING MEMBRANE COMPRISING MONOLITHIC 2D MATERIAL AND IONOMER, A PROCESS FOR PREPARING SAME AND USE OF SAME IN FUEL CELL AND HYDROGEN GAS SENSOR

This Application is a national Stage Entry of PCT International Application No. PCT/GB2015/052663 filed Sep. 15, 2015, which claims priority to Application No. GB1416527.8, filed Sep. 18, 2014, the contents of which are incorporated herein by reference in their entireties.

Graphene is known from the literature to be impermeable to all gases and liquids as described in, for example, J. S. Bunch et al.: Impermeable atomic membranes from graphene sheets; Nano Lett. 8, 2458-2462 (2008). Indeed, small atoms such as hydrogen are not expected to penetrate through graphene's dense electronic cloud even over an extended timescale of billions of years as predicted in O. Leenaerts, B. Partoens, F. M. Peeters.: Graphene: a perfect nanoballoon. Appl. Phys. Lett. 93, 193107 (2008).

Membranes made from graphene and its chemical derivatives show exceptional permeation properties. Defect-free single layer graphene is completely impermeable to all gases and liquids. Due to this intriguing property, graphene-based membranes are believed to be a perfect candidate for barrier and protection coating applications. In addition, graphene's mechanical strength, optical transparency, low toxicity and high chemical and thermal stability provide an edge over other barrier materials.

Notwithstanding the vast amount of literature relating to the impermeable nature of graphene, we have now produced monolayers of graphene and hexagonal boron nitride (hBN) which surprisingly are permeable to thermal protons, i.e. hydrogen ions under ambient conditions. The atomically thin proton conductors of the present invention have potential applications in many hydrogen-based technologies such as providing membranes in hydrogen fuel cells, separation of hydrogen from gas sources such as shale gas or natural gas, and in sensing/detector/measurement applications. These membranes of the invention also benefit from all of the exceptional mechanical properties of graphene meaning that they are strong and resilient and hence suitable for a variety of applications where mechanical strength is also a useful attribute.

Graphene has recently attracted attention as an ultimately thin membrane that can be used for development of novel separation technologies. For example, one academic study (Nair et al. Science, 2012, 335, 442-444) has shown that, surprisingly, graphene oxide membranes which are composed of graphene oxide having a thickness around 1 μm supported on porous alumina are permeable to water even though they are impermeable to helium. These graphene oxide sheets allow unimpeded permeation of water which occurs $10^{10}$ times faster than He. The barrier properties of graphene are reviewed in V. Berry: Impermeability of graphene and its applications. Carbon 62, 1-10 (2013).

Previous work on proton conductivity within wafer-thin materials has been done using graphene-based laminates or composites. Those materials consist of millions of individual micron-sized graphene flakes. In these composite materials, the protons move between the individual graphene flakes, with some small contribution from microscopic holes/defects in the interior of flakes. Protons are not actually able to penetrate and pass through the individual flakes themselves because of the energy barrier but instead steer a course through the material by navigating around the individual flakes. In contrast, in the case of the 2D material of the present invention, the protons move through the body of the material itself i.e. through its crystal structure. This result is quite unexpected in view of the body of literature exploring the impervious nature of graphene and other 2D materials.

However, irrespective of the impervious nature of graphene, the extreme barrier properties of graphene can still be exploited using appropriate mechanical treatment of the graphene sheet. When the sheet is perforated with atomic or nanometer accuracy to provide holes, graphene may provide ultrafast and highly selective sieving of gases, liquids, ions, etc. and effectively function as a size-exclusion sieve. This is because, in its pristine state, the graphene sheet is absolutely impermeable for all atoms and molecules moving at thermal energies and thus no material passes through except via the deliberately introduced holes.

Theoretical estimates for the kinetic energy E required for an atom to penetrate through unperforated monolayer graphene vary significantly, depending on the employed model. However, even the smallest literature value of 2.4 eV for atomic hydrogen is 100 times larger than typical $k_BT$ ($k_B$ is the Boltzmann constant and T the temperature) which ensures essentially an impenetrable barrier). Therefore, only accelerated atoms have sufficient energy to be capable of penetrating through the one atom thick crystal. The same effect is predicted for other two dimensional (2D) crystals, although only graphene has so far been considered in this context.

Protons can be considered as an intermediate case between small particles such as electrons that are able to tunnel relatively easily through atomically thin barriers, on the one hand, and small atoms on the other hand which are not able to permeate even a single atomic layer of a material such as graphene. Whilst it has been calculated that the energy required for permeation, E, decreases by a factor of up to 2 if hydrogen is stripped of its electron, even this represents a prohibitively high energy barrier to allow appreciable transport of thermal protons. In this respect, an E value of 1.2 eV is estimated to result in permeation rates still as long as about $10^9$ sec.

We have now found a method of facilitating proton or deuteron permeation through monocrystalline membranes made from mono- and few-layers of graphene, hBN, molybdenum disulfide (MoS2), and tungsten disulfide (WS2). Deuterons are charged ions of the isotopic form of hydrogen known as deuterium. In effect, the protons or deuterons are charge carriers that pass through the graphene membrane. This can be contrasted with the passage of gaseous hydrogen. Hydrogen is an uncharged gaseous species which is diatomic. In other words, the gas is in molecular form when considering the normal barrier properties whereas in the case of the present invention, the species which is being transported through the membrane is a charged ion comprising a single atom.

In all aspects of the invention described below, the term "conductivity" refers to electrical conductivity, and the terms "permeability" or "transport" refer to the passage of ionized monatomic species through the membrane.

According to a first aspect of the present invention, there is provided a proton-conducting membrane comprising:
a monolayer of a 2D material,
an ionomer coating provided on at least one side of the 2D material; and
optionally a substrate.

The membrane of the invention may conduct protons and isotopes thereof. The membrane may contain from 2 to 5 layers in addition to being a simple monolayer. In either case, the material is monolithic.

Thus, in one embodiment, the invention relates to a proton conducting membrane comprising:
a monolayer or from 2 to 5 layers of a 2D material, wherein the 2D material is monolithic,
an ionomer coating provided on at least one side of the 2D material; and
optionally a substrate.

This type of membrane can be used in a fuel cell such as a methanol fuel cell. One significant benefit of the membranes of the invention is the fact that they can be produced in a form which is much thinner than traditional membranes. A thick membrane has a greater electrical resistance and thus the membranes of the present invention provide a fuel cell of improved efficiency. Traditionally, one problem with reducing the overall thickness of a membrane is that both the hydrogen and the methanol tend to defuse through the membrane without actually forming the protons which are necessary for the functioning of the cell as a fuel cell. Despite being able to be produced in very thin form, the membranes of the present invention allow transmission of protons under ambient conditions without any diffusion of either water or methanol or indeed other species. This represents a significant advantage relative to existing membrane technology.

As mentioned above, the membrane may also conduct isotopes of protons i.e. deuterons. In a second aspect of the invention, there is provided a deuteron-conducting membrane comprising:
a monolayer of 2D material,
an ionomer coating provided on at least one side of the 2D material; and
optionally a substrate.

The membranes of the first and second aspect of the invention may be the same. In other words, the same graphene membrane may allow the passage of protons and deuterons.

The 2D material in any of the various aspects of the invention is a single piece of material. It can thus be described as monolithic. Monolithic in the context of this invention means that the 2D material is formed from a single piece or crystal. In other words the material has no joint or seams.

In some embodiments, the ionomer is coated directly on to at least one side of the 2D material. In some embodiments, it is coated directly on both sides of the 2D material. Usually, however, one side is coated with the ionomer and the other side is in contact with the substrate.

Electrodes may be attached mechanically to one or both sides of the proton and/or deuterium conducting membrane. The electrodes may be made of a metal such as platinum or palladium though in principle any electrode material can be used. Platinum is preferred. Alternatively, electrodes, such as Pt, may be deposited on one or both sides of the membrane by evaporation techniques. In an embodiment, the membrane of the invention includes a pair of electrodes, one either side of the membrane and in direct electrical contact with the membrane in order to allow the passage of current through the membrane and ionomer ensemble. In another embodiment, the membrane includes an electrode on the "output" side of the membrane i.e. the side of the membrane from which protons and/or deuterons are emitted when in use. A second electrode may be in direct contact with the other "input" side of the membrane or the electrode may be in contact with a solution which is itself in contact with the "input" side of the membrane. In this case the electrode is in electrical contact with the membrane but is not directly bound to the membrane. The solution provides a source of protons and/or deuterons. In another embodiment, the electrodes do not form part of the membrane structure at all but are each in contact with solutions on the two respective sides of the membrane. Electrical contact is formed due to both of the solutions being in contact with the respective sides of the membrane.

A process for preparing a proton-conducting membrane as described above in the first aspect of the invention comprises the following steps:
providing a monolayer of a 2D material,
either coating an ionomer on at least one side of the 2D material so that one side of the ionomer is in contact with the 2-D material and the other side is exposed, or applying a layer of material comprising an ionomer and a nonconductive structural component to one side of the 2-D material; and
optionally providing a substrate in contact with an exposed side of the at least one ionomer coating.

A similar process can be used to make a membrane that allows the passage of deuterons.

A process for preparing a deuteron-conducting membrane as described above in the second aspect of the invention comprises the following steps:
providing a monolayer of a 2D material,
either coating an ionomer on at least one side of the 2D material so that one side of the ionomer is in contact with the 2-D material and the other side is exposed, or applying a layer of material comprising an ionomer and a nonconductive structural component to one side of the 2-D material; and
optionally providing a substrate in contact with an exposed side of the at least one ionomer coating.

In an embodiment, the process further includes the step of adding an electrode to the membrane. In a further embodiment, the process includes adding a pair of electrodes, one to either side of the membrane. This procedure applies to any membrane according to the invention. The electrodes can be added mechanically or by evaporation of a layer of metal onto the membrane.

The layer of material comprising an ionomer and non-conductive structural component is intended to have greater strength than simply the ionomer coating itself might have. The non-conductive structural component must itself either be of porous material or be arranged to include pores which allow fluid to pass through in the case in which it is not itself inherently porous.

In this aspect of the invention, the ionomer is a proton conducting polymer. Suitable proton conducting polymers are known to the skilled person and are also described below in more detail in the embodiments which are applicable to all of the other aspects of the invention. The Nafion® family of polymers is particularly suitable.

The ionomer may be provided on one side or both sides of the 2-D material as appropriate. It is not necessary for a substrate to be present but a porous substrate may be used to support the ionomer on one side or both sides of the 2-D material. In this arrangement, it is important for the substrate to be porous so that fluid communication is possible with the ionomer and 2-D material from the outside of the membrane. This is necessary in order to allow protons to access the ionomer and 2-D material.

The ionomer coating is applied directly on to one side of the 2D material. In an embodiment, a second ionomer coating is also provided. This may be directly on the other side of the 2D material. However, it is possible for these to be an intervening layer between the 2D material and the second ionomer coating. It is possible for the substrate to be present between the second ionomer coating and the 2D material so that only one side of the 2D material is coated directly with ionomer.

In alternative embodiments, the ionomer and substrate may effectively be provided as a single entity. In other words, it is a single structure. In this case, the substrate might take the form of a polymer mesh which has been infused with a proton or deuteron conducting membrane. For example, a known proton conducting membrane of the Nafion® family may be infused with another nonconductive material such as a polymer in order to provide structural reinforcement. Thus, Nafion® might be infused in a polymeric mesh such as a PTFE mesh. When the ionomer is provided on both sides of the 2-D material, the ionomer may be the same or different. It is also possible for one or both of the ionomer layers to be associated with a substrate and/or to be provided in the form of a single structure combining the functions of the ionomer and substrate in a single entity. In some embodiments, the ionomer e.g. Nafion® might be sufficient on its own right to provide sufficient support for the 2-D material and consequently the combination of the ionomer and 2-D material might be employed in that form in a direct methanol fuel cell.

In this aspect of the invention, the substrate functions to provide strength and support to the 2-D material and the nature of the substrate is important in ensuring this requirement is met. However, the substrate must be permeable in order to allow protons, and any fluid from which protons might be derived (and similarly for deuterons), to be in communication with the 2-D material.

The substrate is a material which allows the passage of protons and/or deuterons through the membrane structure. The substrate material itself may be impermeable per se to protons and deuterons but has been provided with holes or other apertures through which the protons and/or deuterons may pass. The substrate serves to provide structural integrity to the membrane. The substrate may be made of metal or of non-metal. Non-metal is preferred. Suitable substrates include plastic materials (polymers e.g. PTFE etc), glass and other ceramics. A material such as silicon-nitride is particularly suitable.

In a third aspect of the present invention, there is provided the use of a monolayer of a 2D material as a proton conductor. The 2-D proton conductor of the present invention can be used for a variety of purposes including in the construction of an electrode for a fuel cell or in separation or detection apparatus for hydrogen.

The 2-D material may be utilised in its own right without the need for any other layer being provided, or it may be provided in conjunction with a layer of ionomer provided on at least one side of the 2-D material.

In this aspect of the invention, the 2-D material provides a selective barrier allowing only protons to pass through the atomic layer and preventing the passage of other materials such as methanol, water and gases.

In a fourth aspect of the present invention, there is provided an ensemble suitable for producing a proton and/or deuteron conducting membrane and comprising:
a monolayer of a 2D material, wherein the monolayer is disposed on one side of an ablatable layer and in register with a discontinuity in that layer, and
an etchable substrate provided on the other side of the ablatable layer.

In the context used in this application, the term "in register with" means aligned with and overlapping with the discontinuity.

In an embodiment, two faces of the substrate are each covered by an ablatable layer.

The substrate may be etchable. This means that the ensemble might be exposed to patterned radiation or plasma in order to reproduce the pattern on the ensemble and the underlying substrate then etched in order to reproduce the same pattern in the substrate.

This ensemble is effectively a precursor to one type of 2-D proton conducting membrane of the present invention.

According to a fifth aspect of the present invention, there is provided a proton and/or deuteron conducting membrane device comprising:
an etchable substrate, two faces of which are each covered by a discontinuous ablatable layer;
a monolayer of a 2D material, wherein the monolayer is disposed on top of one of the ablatable layers and in register with a discontinuity in that layer and the underlying substrate;
an ionomer coating provided on each side of the substrate; and
an electrode in electrical contact with each ionomer coating, wherein each of the ablatable layers and the 2-D material is covered by the respective ionomer coating so as to separate each electrode from the respective underlying ablatable layer and 2D material.

In a sixth aspect of the present invention, there is provided a method of fabricating an ensemble suitable for forming a proton and/or deuteron conducting device incorporating a monolayer of 2D material as the medium through which the protons pass. The proton and/or deuteron conducting device may be a proton conducting device of the type described in the fourth aspect above.

The process comprises the steps of:
partially masking one face of an ensemble comprising an etchable substrate, two faces of which are each covered by an ablatable layer, so as to leave exposed at least part of one of the ablatable layers;
exposing the masked face to radiation or plasma in order to form a pattern in which the underlying substrate is revealed in exposed regions;
removing the mask;
etching the substrate from a region corresponding to the pattern; and
introducing a discontinuity into the surface of the other ablatable layer.

In a seventh aspect of the present invention, there is provided a method of fabricating a proton and/or deuteron conductor. This method employs the steps described above in the fifth aspect of the invention. Additionally, the following steps take place after the discontinuity has been introduced into the surface of the other ablatable layer:
providing either a monolayer of a 2D material selected from graphene and hBN or a monolayer of a 2-D material selected from graphene, hBN, $MoS_2$ and $WS_2$ which has been decorated with a discontinuous film formed from one or more transition metals selected from groups 8 to 10 of the periodic table, on top of the ablatable layer into which the discontinuity has been introduced and in register with the discontinuity;
coating each of the two sides of the substrate bearing ablatable layers with an ionomer; and
providing an electrode in electrical contact with each ionomer layer.

In certain embodiments of the various aspects of the invention, the pattern is normally a hole.

In certain embodiments, the etchable substrate is a material which can be chemically etched. Typical chemical agents include inorganic acids and bases and fluoride donating agents. The substrate may be made from silicon, germanium, or a mixture of these. The substrate may be doped (with, for example, an element selected from groups 13 or 15 of the periodic table) or be un-doped; normally it is un-doped. Silicon is a preferred substrate material. In the case of silicon, it can be etched with potassium hydroxide. Other substrate and etching combinations are known in the art, particularly in the area of producing semiconductor topographies, and these substrates are within the contemplation of the present invention. The substrate is in the form of a wafer or a sheet i.e. it's length and breadth are substantially greater than its thickness.

In an embodiment, the ablatable layer is photoablatable. This can be achieved using actinic radiation, for example ultraviolet, visible or infrared light, or reactive ion etching (using chemically reactive plasma). In a preferred embodiment, reactive ion etching is used.

An ablatable layer is usually provided on two opposing faces of the substrate. Normally the substrate is in the form of a wafer or a sheet and the two faces chosen are the two largest faces so as to present a laminate structure in which the substrate forms a thin layer sandwiched between the two ablatable layers. It is not inconceivable that two faces other than opposite faces of the substrate are coated with an ablatable layer; in these circumstances, there would still be a passage for proton transport between the two ionomer coatings. However, the two ionomer coatings would need to be physically and electrically separated in order to render such an arrangement viable The ablatable layers may be made from any conventional material which are able to be removed on exposure to actinic radiation or reactive ion etching. Silicon nitride (SiN) is a suitable material for forming one or both ablatable layers and can be easily removed by reactive ion etching.

The process of forming a discontinuity in the ablatable layer involves applying a patterned photoresist i.e. a mask to the ablatable layer and then exposing the masked ablatable layer to a source of radiation or plasma in order to remove material from unexposed regions. The ablatable layer covering the substrate is thus discontinuous and exposes the substrate in one or more regions. Normally, a single region is exposed.

After exposure and subsequent removal of the mask, parts of the ablatable layer on one side of the substrate have been removed as dictated by the pattern. At this point, the underlying substrate material can then be removed by chemical means. However, it is not inconceivable that the substrate could also be removed from these regions by mechanical means or by plasma etching.

It is then necessary to provide one or more discontinuities in the other ablatable surface. In this respect, the ablatable material for the second ablatable layer only needs to be a material which is capable of being partially removed in order to provide a discontinuity. Thus a material which is not photoablatable or removable by reactive ion etching could in principle be used for this second layer. In such a case, the discontinuity might be provided by mechanical means in order to puncture the layer. The discontinuity is usually in the form of a hole but it could equally be a series of holes or other patterns in the layer.

As mentioned above, in all aspects of the present invention, the term "conductivity" refers to electrical conductivity (and not to the permeability of gas through the bulk material). Thus, the invention is concerned with the transmission of protons and/or deuterons through the bulk material.

The membrane may be any membrane according to the invention as described previously. The potential difference applied results in a current flow across i.e. through the membrane. The charge is carried by protons and/or deuterons. It is important that the hydrogen isotope can ionize. In other words, the materials containing the hydrogen isotopes should be capable of ionizing to the charge carrying species. The charged species recover an electron at the electrode on the second side of the membrane. This electrode is on the second face of the membrane or is in a medium e.g. solution which is in electrical contact with the second face. This electrode can be designated the second electrode for ease of reference with the first electrode being on the input side of the membrane.

The first electrode is in the initial solution. Usually this solution contains proton and/or deuterium-containing molecules. The application of a potential difference ionizes hydrogen and/or deuterium in the solution from the hydrogen-containing and/or deuterium-containing material present in solution on the input side of the membrane.

The first face of the membrane is the "input" face or side of the membrane and the second face is the "output" face or side of the membrane.

The embodiments of the invention described below are generally applicable to each of the aspects of the invention described above.

Any 2D material may be used in accordance with the invention. The 2D material is a single piece of material. 2D type materials are layered materials in which there are strong bonding interactions between atoms within the same layer of structure (usually covalent bonds) and weaker (usually non-covalent) bonds between atoms in adjacent layers. A number of materials are known including graphite, with graphene being the ultimate monolayer product derived therefrom, transition metal dichalcogenides, transition metal oxides and certain other binary compounds. Examples include: graphene, BN, $Bi_2Te_3$, $Bi_2Se_3$, $MoS_2$, $WS_2$, $MoSe_2$, $MoTe_2$, $TaSe_2$, $NbSe_2$, and $NiTe_2$. Graphene and hBN work well as proton conductors in their native form i.e. unmodified form. Other monolayers of 2-D material may require the presence of a catalytic metal selected from Groups 8 to 10 of the periodic table in order to reduce the thermal barrier sufficiently to allow proton conduction. This is present as a discontinuous coating or "decoration" on the 2-D material.

The invention envisages that the coating of the catalytic metal may be applied to any of the 2-D materials described in relation to the various aspects of the invention. In all cases, the coating is discontinuous.

Preferably, the 2-D material is selected from a monolayer of graphene or hBN, or a monolayer of a 2-D material selected from graphene, hBN, $MoS_2$ and $WS_2$ which has been decorated with a discontinuous film formed from one or more transition metals selected from Groups 8 to 10 of the periodic table.

The term "monolayer" refers in the case of all 2-D materials to a single atomic layer of the material. In the particular case of hBN, it is also possible that more than one layer i.e. 2 layers, 3 layers or even 4 layers may give rise to proton transport in accordance with the invention. In this special case, the term "monolayer" which has otherwise been applied to all of the 2-D materials of the invention having only a single atomic layer, including graphene, is also intended to encompass 2 layer, 3 layer and 4 layer hBN. Similarly, in the case of graphene it is also possible for a 2 atomic layer thick sheet of graphene to give rise to proton conduction under certain circumstances although this is not as good as the proton conductivity of a graphene monolayer. Thus in this particular circumstance the term "monolayer" also applies to 2 layer graphene.

It is important that the 2-D material is a continuous structure in the sense of not being perforated by the deliberate inclusion of holes or other gaps in the lattice. Generally, it is preferred if the 2-D is in "pristine" condition in the sense of containing little or no defects. Ideally, there should be less than 10%, and more preferably less than 5%, or still more preferably less than 1% defects in the material. A proportion of defects of less than 0.2% is most preferable. Having a minimum number of defects ensures that the membrane operates an effective selective barrier favouring only proton transmission and nothing else. As will be seen below, we have demonstrated that the protons are transmitted directly through the atomic layer and are not transported through defects. Similarly, we have shown that other materials are effectively blocked by the atomic layer and do not pass through any defects which might be present.

The ionomer coating is a conductive polymer. The conductive polymer is a proton conducting polymer. Suitable polymers are described below and include sulfonated polymers and the like.

The two ionomer coatings that are provided on top of the ablatable layers which are themselves provided on two faces of the substrate are usually physically and electrically separated so as to ensure effective proton transport from one metal electrode through the conductive polymer on one side of the 2-D material, and then through the 2-D material itself, and subsequently through the other conductive polymer on the other side of the 2-D material and to the second metal electrode.

The electrode is a metal electrode and functions as a proton injecting electrode. Typically, this electrode is based on a hydride of a transition metal.

For the avoidance of doubt, it is emphasized that in accordance with the invention the thermal protons are able to pass through the atomic layer of the 2-D material of the present invention without the need for any electrical potential being applied. Thus, in certain circumstances, the driving force for passage of the protons can be a concentration gradient existing between different sides of the 2-D material.

In other cases, an electrical potential can be applied in order to drive the process. A fuel cell derived from the material of the invention can comprise a membrane material of the present invention formed from the 2-D material and ionomer, which is separated by a proton conducting membrane from a second electrode (which is usually porous) according to the present invention. The supply of fluid to a cell containing such an electrode assembly allows current to be drawn from the 2 electrodes due to a conventional electrochemical process which is then able to occur.

We have found that monolayers of graphene and hexagonal boron nitride (hBN) are permeable to thermal protons, i.e. hydrogen ions under ambient conditions. In contrast, no proton transport is detected for a monolayer of molybdenum disulfide, bilayer graphene or multilayer hBN. At room temperature, monolayer hBN exhibits the highest proton conductivity with a low activation energy of about 0.3 eV. Graphene becomes a better conductor at elevated temperatures such that its resistivity to proton flow is estimated to fall below $10^{-3}$ Ohm per $cm^2$ above 250° C.

We have also found that the barrier to proton transmission through the 2D structure can be further reduced by decorating monolayers of 2D compounds with catalytic nanoparticles based on a transition metal.

An important difference between existing prior art membranes comprising graphene and the like resides in the fact that the prior art membranes are composites formed from a large number of individual flakes of graphene or graphene oxide etc. We use a single piece of the 2D material.

A single piece of graphene or hBN is preferred. Graphene is most preferred. The material is a monolayer (for graphene and hBN this means one atomic layer; in the case of other 2D materials such as MoS2 etc. this means one molecular layer which actually comprises three atomic layers due to the crystal structure). However, in certain cases a few layers i.e. 2 to 5 layers of the 2D material are permitted. Thus in some cases the membrane in each of the aspects described above may have from 2 to 5 layers of a 2D material. Again, the 2D material is monolithic As shown below, large crystalline sheets of graphene and hBN monolayers are used to control proton transport. Because they are fragile, the crystalline sheets should be used only in combination with the existing proton conductive materials such as Nafion® or other membranes.

The membranes of the invention are thus very effective at preventing the passage of unwanted species despite the fact that the 2D material is only a monolayer, or in certain cases 2 to 5 layers thick.

One benefit of our approach is that this allows the possibility of decreasing thickness of existing proton membranes (which is currently quite a difficult problem) by stopping permeation of other species even using the thinnest possible membranes. We can thus produce light, cost effective membranes. These membranes show excellent barrier properties whilst permitting the passage of protons.

The proton conducting membranes of the present invention are transparent to thermal protons and are easily able to operate at room temperature, at temperatures in the range of up to 50° C. or at temperatures up to 100° C. Whilst the membranes can also be used at elevated temperatures above these temperatures, one of the key advantages is the fact that proton transport can be achieved at ambient or near-ambient temperatures.

One important application presently concerns the use in fuel cells but the applications are much wider than this. In general terms, the material can be used in any application requiring atomically thin proton conductors. Another important application concerns isotope enrichment of protons, deuterons and tritons.

The 2D crystals can be obtained by any conventional method such as mechanical cleavage or CVD. Mechanical cleavage is preferred.

The 2D crystal is suspended over micrometer size holes etched through Si/SiN$_x$ wafers to form a pre-membrane ensemble comprising: an etchable substrate such as a silicon wafer, a photo-ablatable layer (such as silicon nitride) provided on each side of the substrate and attached to each side thereof, and the 2D material disposed on top of one of the photo-ablatable layers. The resulting pre-membrane ensemble is then coated from either side with an ionomer, for example a conductive polymer such as a sulfonated polymer. A common example of such a material is Nafion® which is a sulfonated tetrafluoroethylene based fluoropolymer-copolymer.

In some embodiments, the electrode may be a metal or a metal compound such as a hydride. In some embodiments, a proton-injecting electrode made from a Group 8, 9, or 10 transition metal hydride, and usually palladium or platinum hydride, is then attached to either side of the coated ensemble. The Group 8, 9, or 10 transition metals are known as the catalytic metals and include iron, ruthenium, osmium, copper, rhodium, iridium, nickel, palladium and platinum. The electrodes may be made of a hydride of one or more of the above transition metals. Of these, the hydrides of nickel, palladium and platinum are most preferred, with palladium or platinum hydrides being most preferred.

The electrode that is attached on each side is in electrical contact with the conducting polymer on the respective side and, when connected to a power source, is able to allow the passage of current through the polymer and through the 2D material. The charge carrying species that passes through the membrane is a proton.

Details of fabrication procedures are described below in more detail.

The sulfonated polymer may be a sulfonated fluoropolymer. In an embodiment, the sulfonated fluoropolymer is a perfluorosulfonic acid.

In an embodiment, the sulfonated fluoropolymer has a structure:

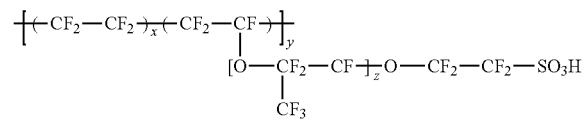

wherein x=5, y=1000 and z=3 (for Nafion®). Similar suitable materials are described in Schultz et al; Chemical engineering and technology; 2001: 24(12): p 1223-1233 and this disclosure is specifically incorporated here in relation to suitable conductive polymers.

In an embodiment, the sulfonated fluoropolymer has a structure:

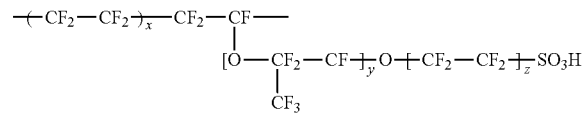

wherein; x=6, y=1 and z=1 (for Nafion®); or x=3-10, y=0.1, z=0-3 (for Asahi Flemion); or x=2-14, y=0.3, z=1-2 (for Aciplex-S). Again, similar suitable materials are described in Micro fuel cells: principles and applications: T. S Zhao, 2009: p 10 and this disclosure is specifically incorporated here in relation to suitable conductive polymers.

In an embodiment, the perfluorosulfonic acid is a commercially available polymer selected from the group consisting of: Nafion® (Du Pont), Dow membrane (Dow Chemical), Flemion membrane (Asahi Glass Co.), Aciplex membrane (Asahi Chem.), BAM (Ballarde), Solvay Hyflon and Gore-select membrane (W. L. Gore, Inc.). In a preferred embodiment, the sulfonated fluoropolymer proton exchange membrane is a Nafion® membrane.

In an embodiment, the perfluorosulfonic acid polymer is selected from the group consisting of: sulphonated polyetheretherketone (sPEEK), sulphonated polysulphone (sPSU), sulphonated polyvinylacetate (sPVA), sulphonated polyetherimide (sPEI) and polybenzimidazole (PBI).

In an embodiment, the sulfonated fluoropolymer coating on either side of the ensemble independently has a thickness of from 1 to 200 μm. In an embodiment, the sulfonated fluoropolymer proton exchange membrane has a thickness of from 80 to 170 μm. In an embodiment, the sulfonated fluoropolymer proton exchange membrane has a thickness of less than 80 μm.

Historically, practical applications of graphene based coatings are limited due to the difficulty in growing defect-free large area graphene. We now consider it possible to produce satisfactory permeable barriers that transmit only thermal protons in accordance with the invention using either mechanically-cleaved or CVD sources of graphene or hBN.

Permeation properties are normally extremely sensitive to the presence of structural defects and cracks present in the specimens. From our experiences, we consider that small molecules such as methanol or water will not be able to go through grain boundaries or crystal defects. This is because it would require pin-holes of >1 nm in size (in consequence necessitating many nearby carbon atoms to be missing) to allow non-proton transport. High quality CVD (without tears) should not have those.

Large area graphene sheets are now available by CVD growth. They are reasonably cheap, if we take as a reference the cost of catalysts used in fuel cells. CVD-grown graphene is not as perfect as monocrystalline samples but is sufficiently good for us to consider that their main proton conductance is likely to occur through the bulk rather than defective sites. CVD growth of hBN may also be employed as an alternative to mechanical cleavage. Other 2D materials that can be used in the proton transport devices of the present invention include $MoS_2$ and $WS_2$. Graphene is the preferred 2D material.

After etching and depositing the 2D material to form the pre-membrane ensemble, the resulting free-standing pre-membrane ensemble was checked for the absence of pin-holes and defects as described below and spin coated from both sides with Nafion®. Nafion® is a polymer that exhibits high proton and negligible electron conductivity. Finally, two proton injecting $PdH_x$ electrodes were deposited onto Nafion® from both sides of the wafer to complete the 2D proton conducting membrane of the present invention.

FIGURES ILLUSTRATING THE INVENTION

The 2D proton conducting membranes of the present invention and the associated properties are shown in the following Figures in which:

FIG. 1 shows: Proton transport through 2D crystals.

FIG. 1a shows Examples of I-V characteristics for monolayers of hBN, graphite and $MoS_2$. The upper inset shows experimental schematics. Middle inset: Electron micrograph of a typical graphene membrane before depositing Nafion®. Scale bar: 1 μm. In a scanning electron microscope, 2D crystals give rise to a homogenous dark background and can only be seen if contamination, defects or cracks are present. Small (pA) currents observed for $MoS_2$ membrane devices (lower inset) are due to parasitic parallel conductance.

FIG. 1b shows Histograms for 2D crystals exhibiting detectable proton conductivity. Each bar represents a different sample with a 2 μm diameter membrane. Left and right insets: charge density (in electrons per Å2) integrated along the direction perpendicular to graphene and monolayer hBN, respectively. The white areas are minima at the hexagon centers; the maxima correspond to positions of C, B and N atoms.

FIG. 2 shows: Proton barrier heights and their catalytic suppression.

FIG. 2a shows T dependences of proton conductivity for 2D crystals. The inset shows log(σ) as a function of inverse T. Symbols are experimental data; solid curves are the best fits to the activation dependence. The T range is limited by freezing of water in Nafion®, and we normally avoided T above 60° C. to prevent accidental damage because of different thermal expansion coefficients.

FIG. 2b shows Proton conductivity is strongly enhanced if 2D crystals are decorated with catalytic nanoparticles. Each bar is a different device. The shaded area indicates the conductivity range found for bare-hole devices (Nafion®/Pt/Nafion®: no 2D crystal was present in the ensemble but for the sake of a fair comparison the same amount of Pt was evaporated). Inset: Arrhenius-type behavior for graphene with Pt, yielding E=0.24±0.03 eV. Monolayer hBN with Pt exhibits only a weak T dependence which indicates that the barrier becomes comparable to kBT.

FIG. 3 shows: Current-controlled proton flux. Top inset: Schematics of our experiment. Monolayer graphene decorated with Pt nanoparticles separates a vacuum chamber from the Nafion®/PdHx electrode placed under the same H2/H2O conditions as described above. Protons permeate through the membrane and rapidly recombine on the other side into molecular hydrogen. The hydrogen flux is detected by a mass spectrometer (Inficon UL200). Different symbols refer to different devices, error bars are shown for one of them, and the red line is the theoretically expected flow rate. Bottom inset: Optical image of one of the devices. Graphene contoured by the dashed lines seals a circular aperture of 50 um in diameter. Nafion® is underneath the graphene membrane.

FIG. 4 shows: Microfabrication process flow. Bottom right: Optical photo of the final device. Scale bar: 1 cm.

FIG. 5a shows Monolayer graphene with some accidental contamination. One of the particles away from the edge is marked by the white circle.

FIG. 5b shows Suspended graphene with pillars of hydrocarbon contamination intentionally induced by a focused electron beam. The inset shows a crack in the membrane; scale bar: 100 nm.

Figure 6:
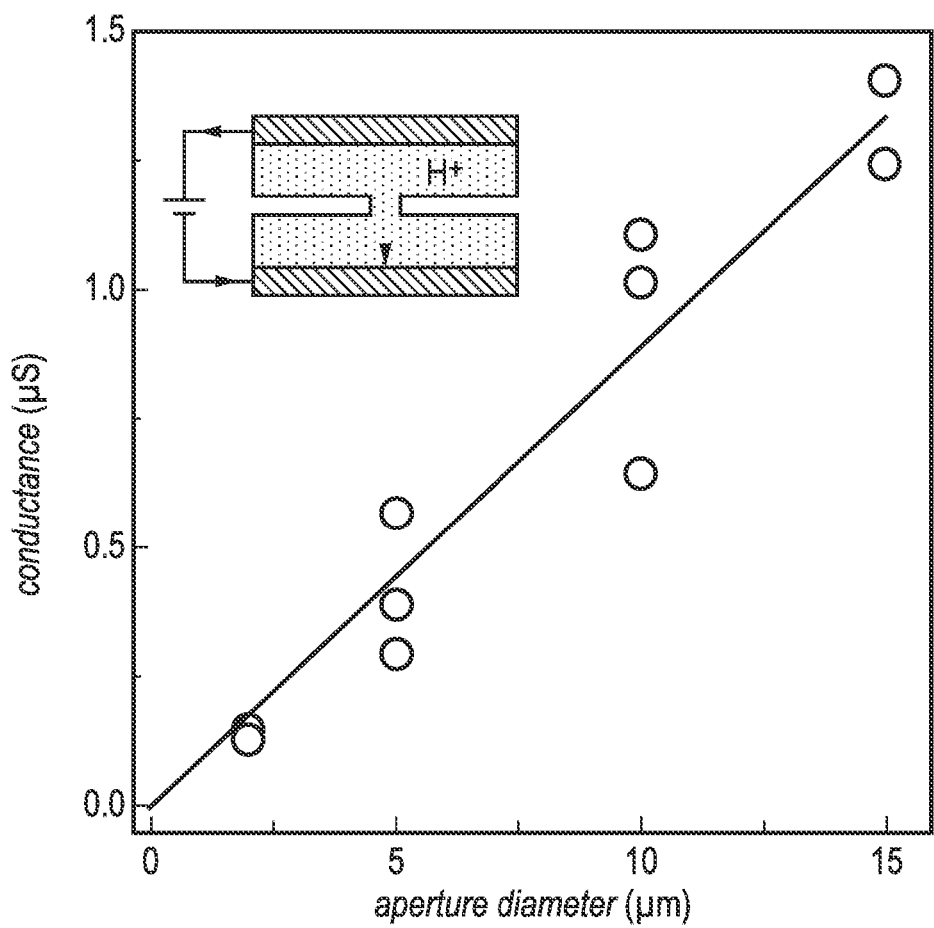

FIG. 6 shows: Bare-hole devices with different apertures. Their conductance exhibits a linear dependence on D as expected for this geometry. The inset illustrates schematics of such devices.

Figure 7:
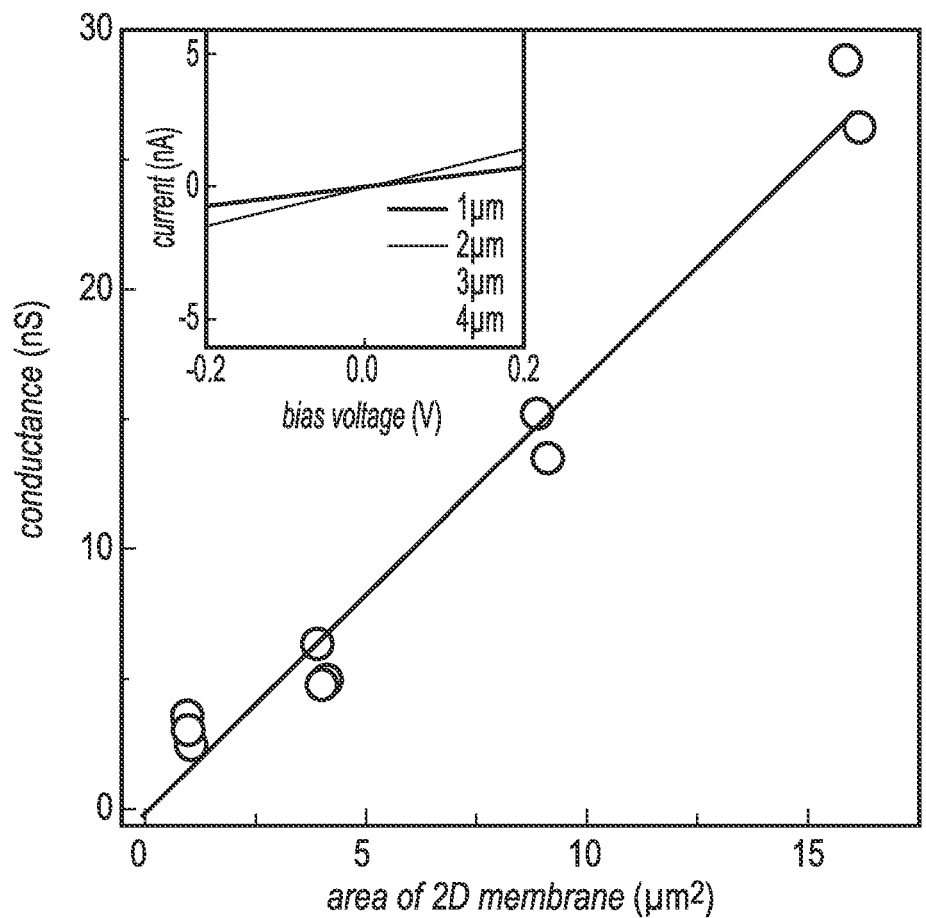

FIG. 7 shows: Proton conductance through monolayer hBN membranes of different sizes. Conductance scales quadratically with D, that is, linearly with A. Inset shows I-V characteristics for devices with different D.

Figure 8:
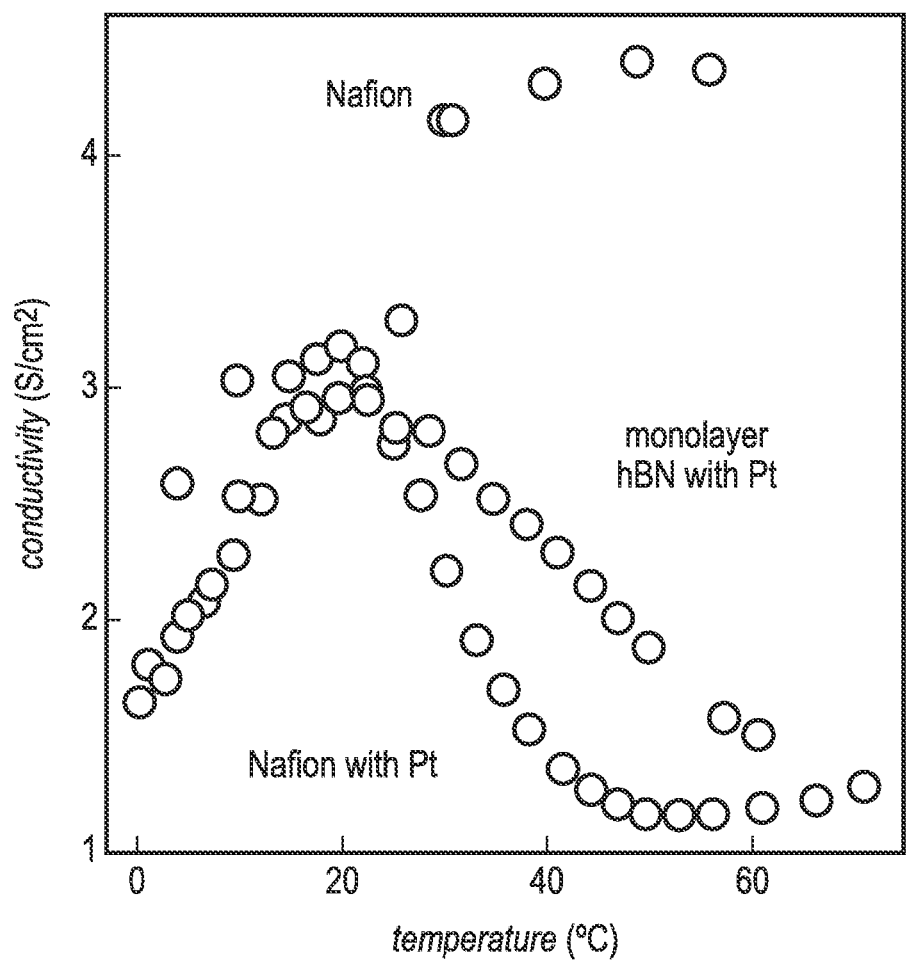

FIG. 8 shows: Proton transport limited by Nafion®. Temperature dependences for bare-hole devices, Nafion®/Pt/Nafion® devices and membrane devices with catalytically-activated monolayer hBN. The nominal conductivity is calculated as the measured conductance S divided by the aperture area A.

Figure 9:
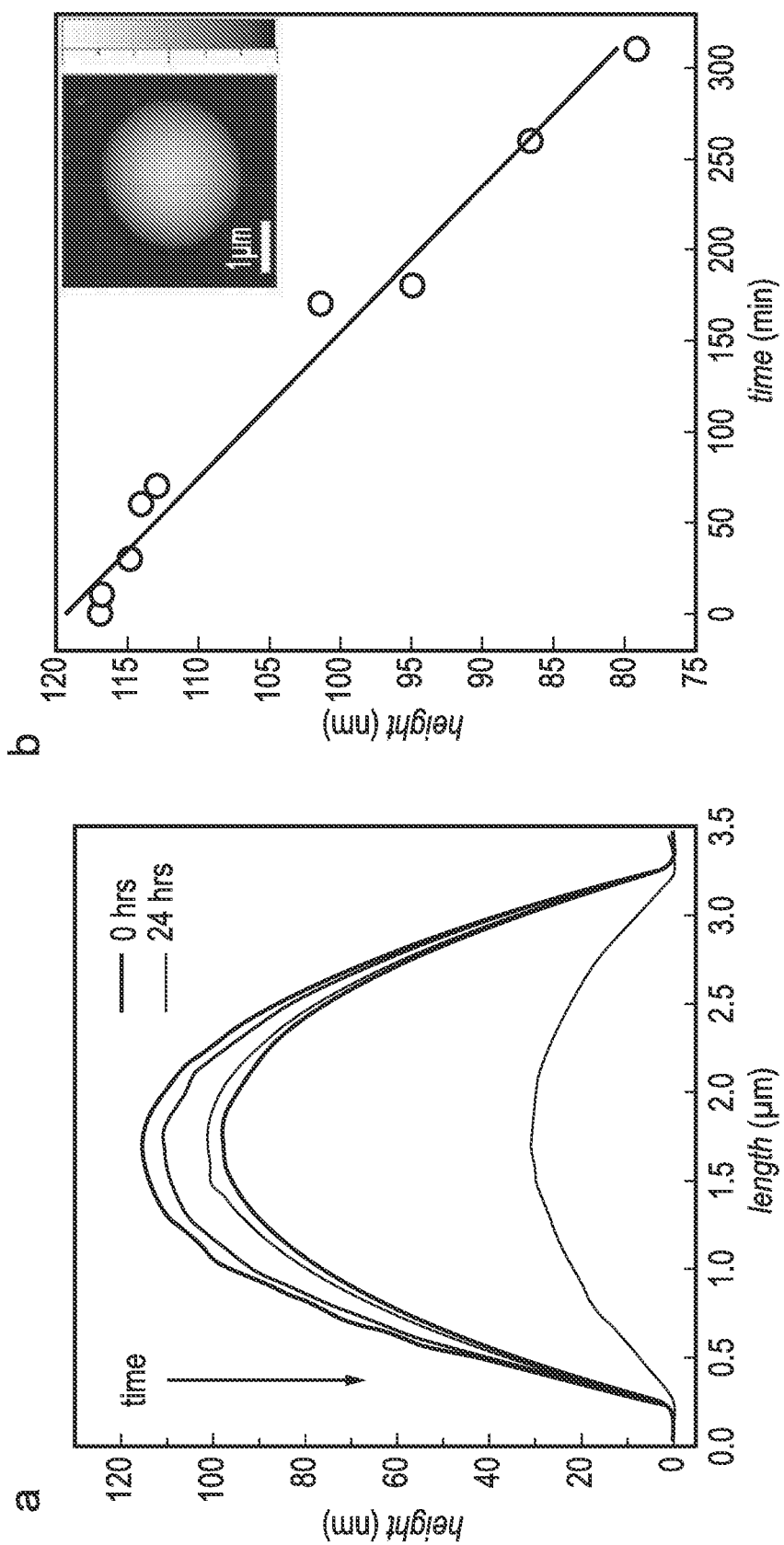

FIG. 9 shows: Deflation of micro-balloons to check for atomic scale defects in graphene membranes.

FIG. 9a shows Height profiles for a typical graphene membrane at different times.

FIG. 9b shows Maximum height as a function of time. The inset shows a typical AFM image of a pressurized graphene microcavity (color scale: 0 to 130 nm). We measured six graphene membranes with all of them showing the same deflation rates, independently of whether Pt was deposited on top or not. Similar behavior was observed for hBN monolayers.

Figure 10:
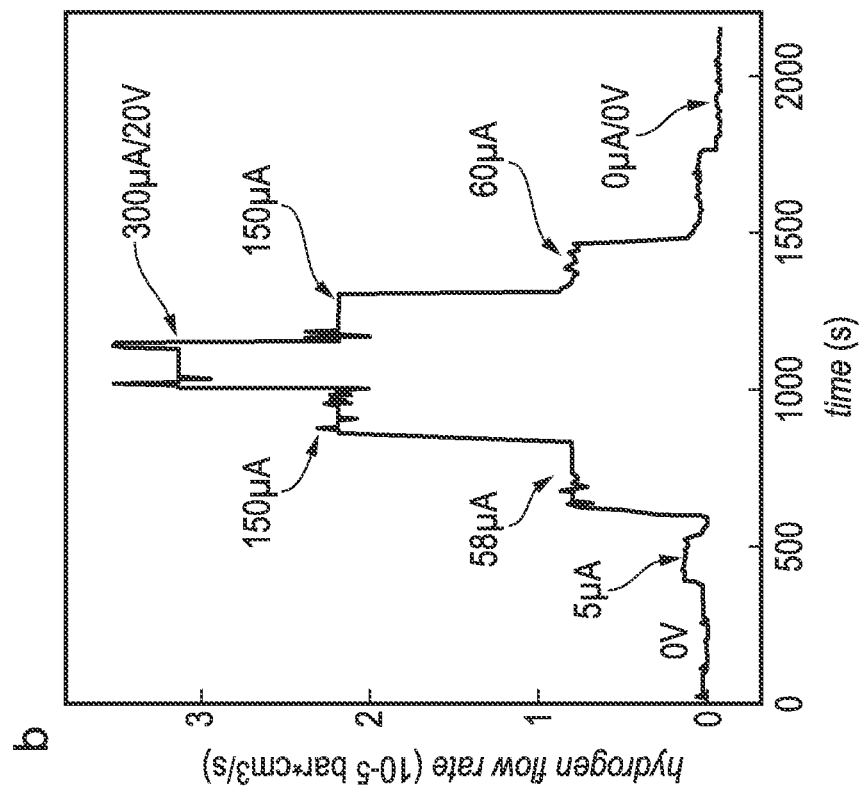
Figure 10:
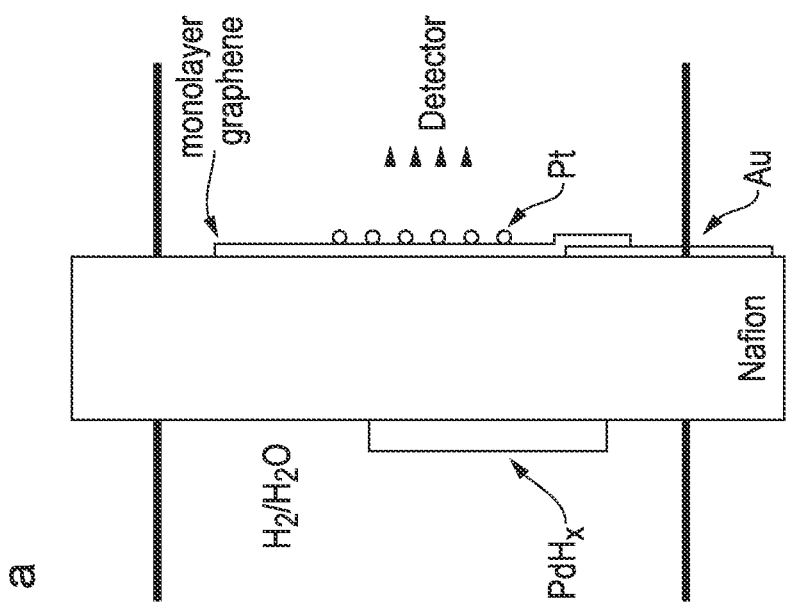

FIG. 10 shows: Hydrogen flow detection.

FIG. 10a shows Schematics of our devices for mass spectroscopy measurements.

FIG. 10b shows Example of the observed hydrogen flow rates as a function of time and measured current for different negative biases on the graphene membrane, which we applied in steps.

Figure 11:
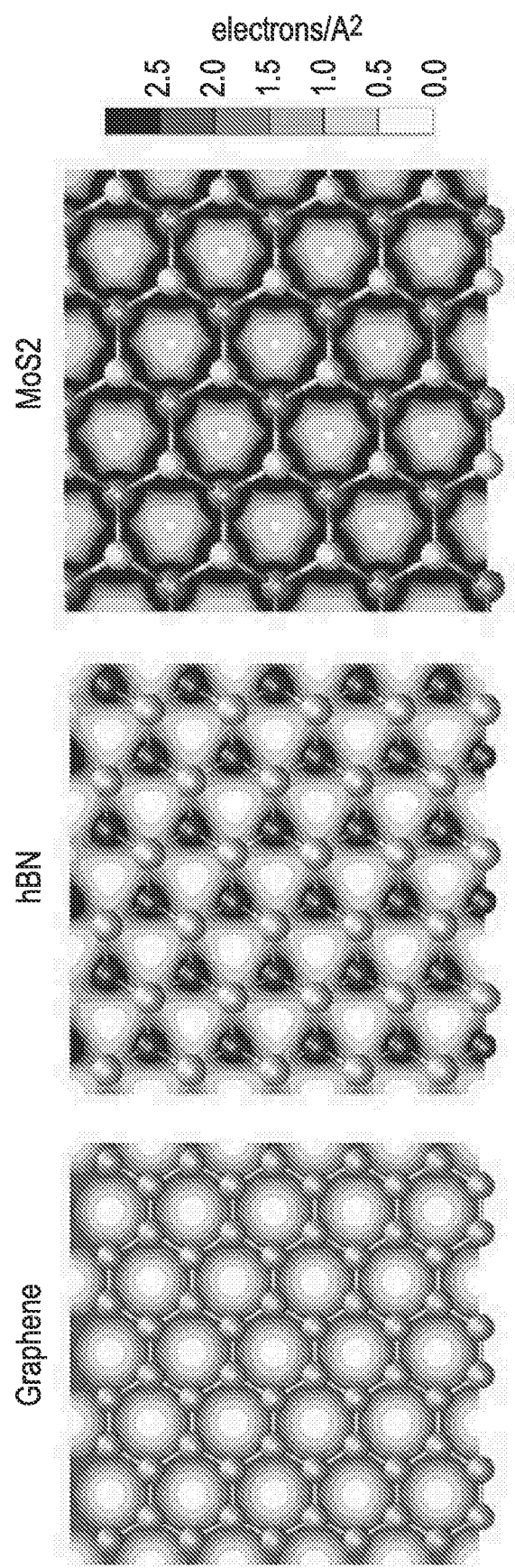

FIG. 11 shows: Electron clouds of 2D crystals. Integrated charge densities for graphene, monolayer hBN (nitrogen is indicated by blue balls; boron in pink) and monolayer MoS2 (S is in yellow, Mo in brown).

Figure 12:
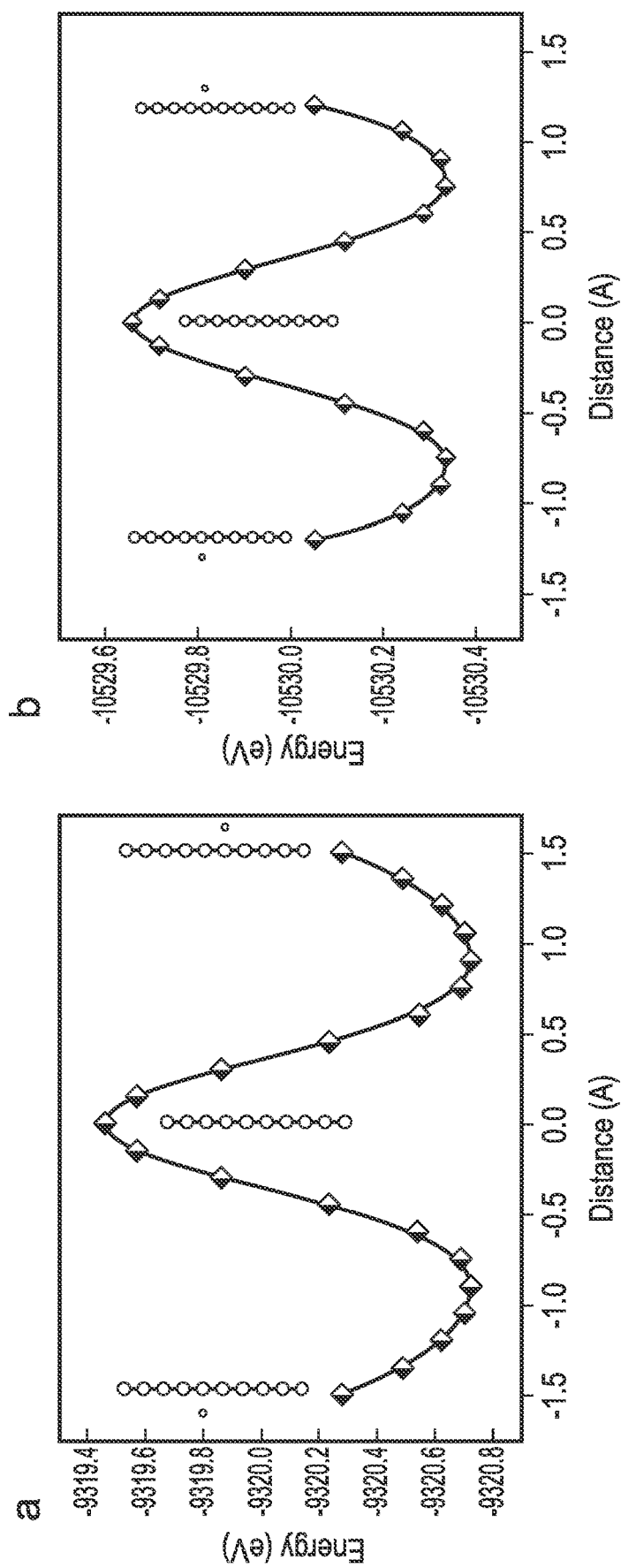

FIG. 12 shows: CI-NEB simulations. Energy profiles as a function of the proton distance to the center of the hexagonal ring in graphene and hBN (FIG. 12a and FIG. 12b, respectively). Carbon atoms are shown as cyan-colored spheres, nitrogen in blue, boron in pink and protons (H+) in white.

Figure 13:
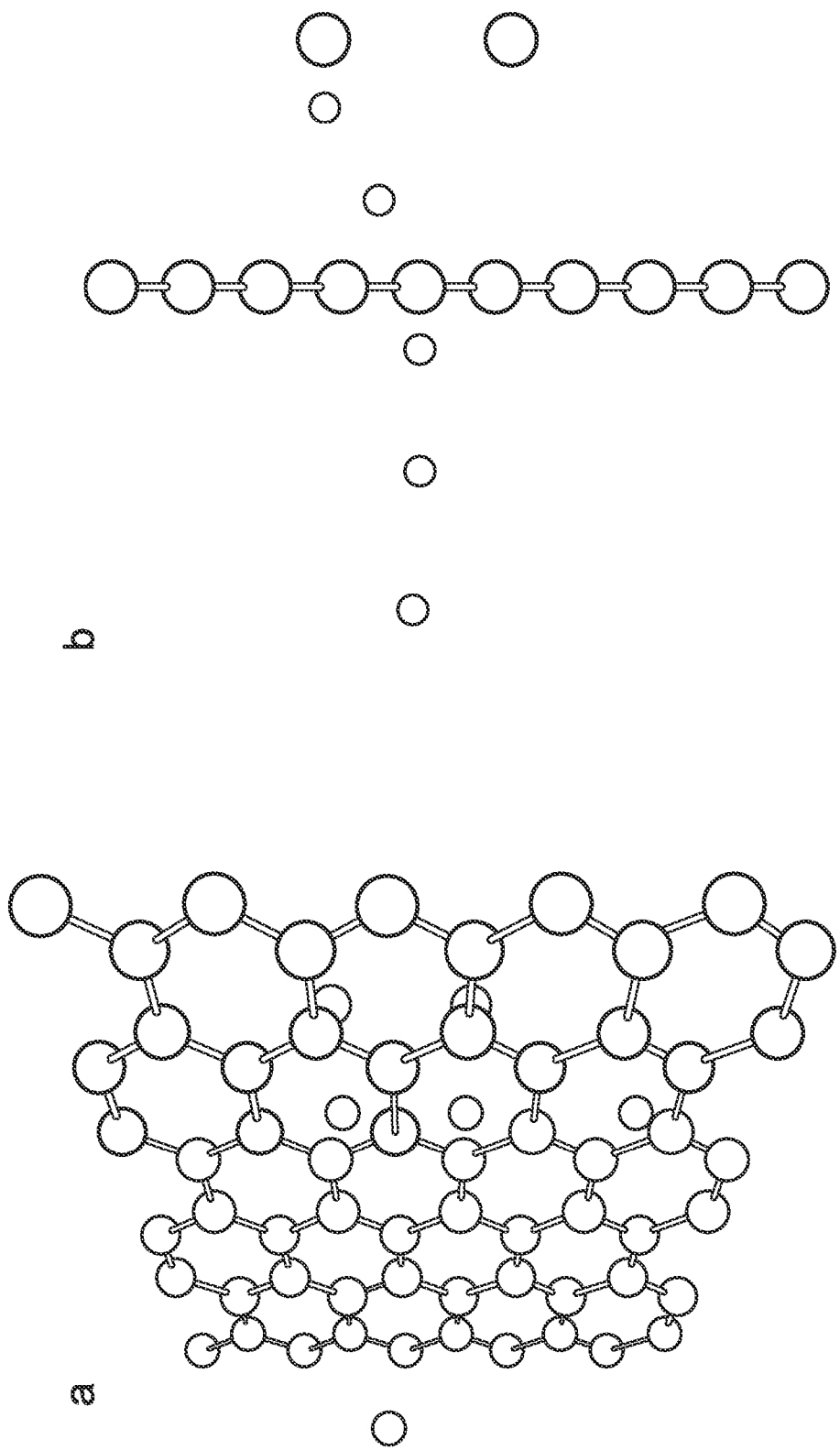

FIG. 13 shows: AIMD simulations for the proton barrier in graphene with Pt. Carbon atoms are shown in cyan, Pt in ochre, H+ in white.

FIG. 13a shows Experimental situation is mimicked by placing 4 Pt atoms at a distance of 4 Å from the graphene sheet.

FIG. 13b shows Figure shows the trajectory of protons with initial kinetic energy E=0.7 eV (the other two Pt atoms cannot be seen due to the perspective). The curved trajectories indicate that the decreased barrier is due to the interaction of protons with Pt.

Figure 14:
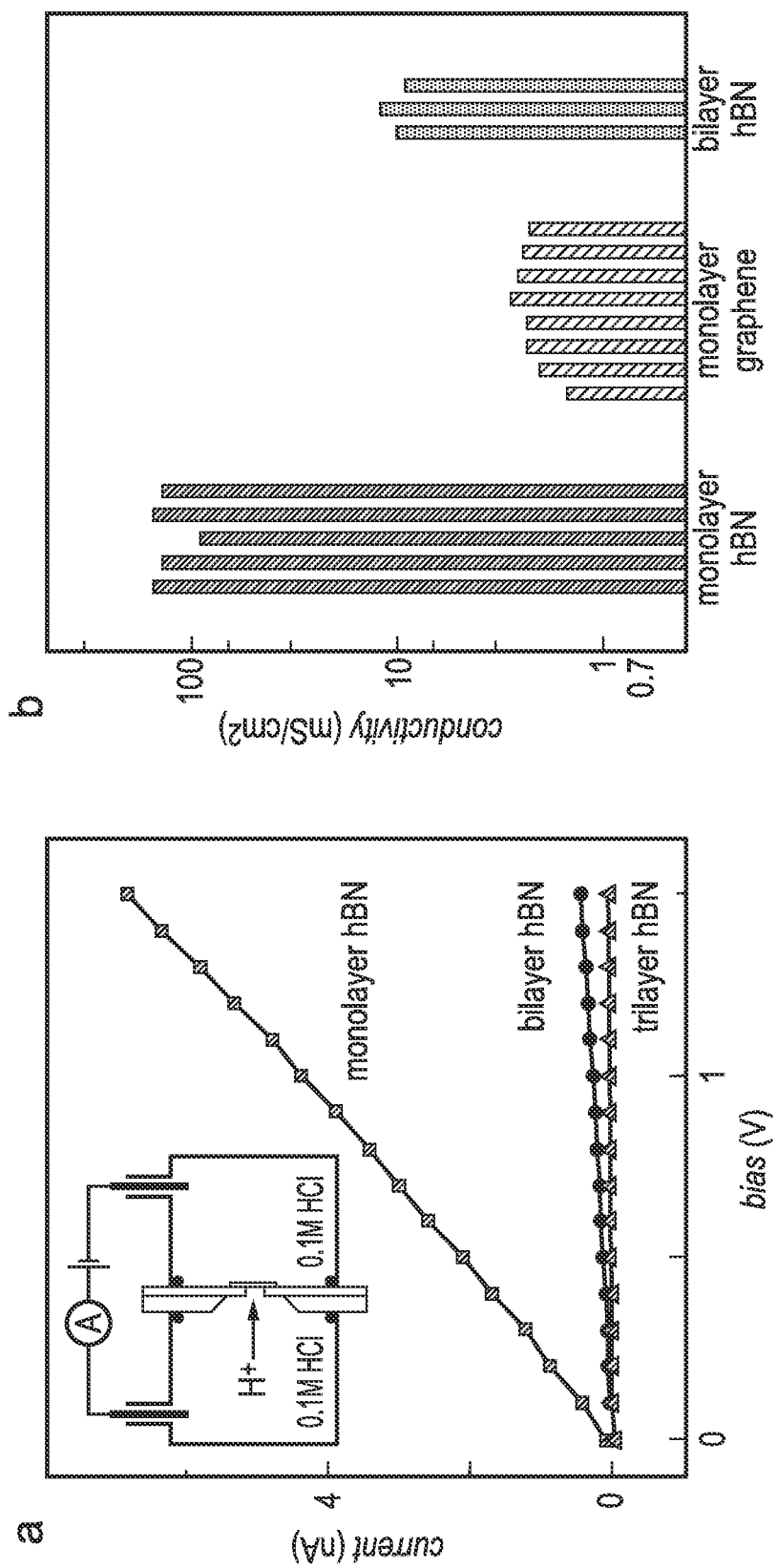

FIG. 14 shows: Proton transport through 2D crystals in liquids.

FIG. 14a shows Examples of I-V characteristics for mono-, bi- and tri-layer hBN covering an aperture of 2 μm in diameter. The inset shows schematics of the liquid cell. In the case of trilayer hBN, the current is within the range given by a parasitic parallel resistance.

FIG. 14b shows Histograms for the 2D crystals that exhibited clear proton current in the liquid cell setup. Each bar represents a different sample with a 2 um diameter membrane. The shaded area shows the detection limit set by leakage currents.

Figure 1:
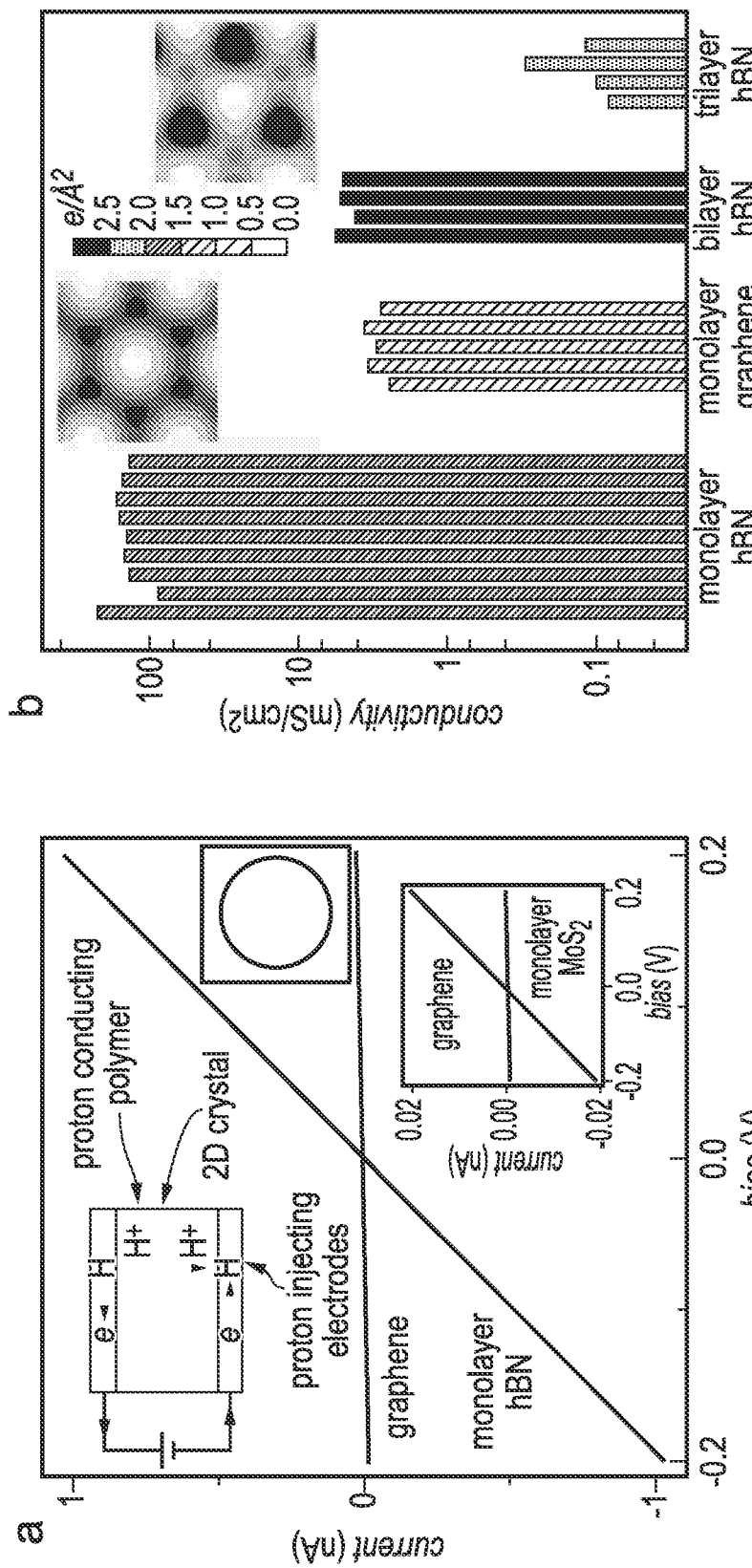
Figure 2:
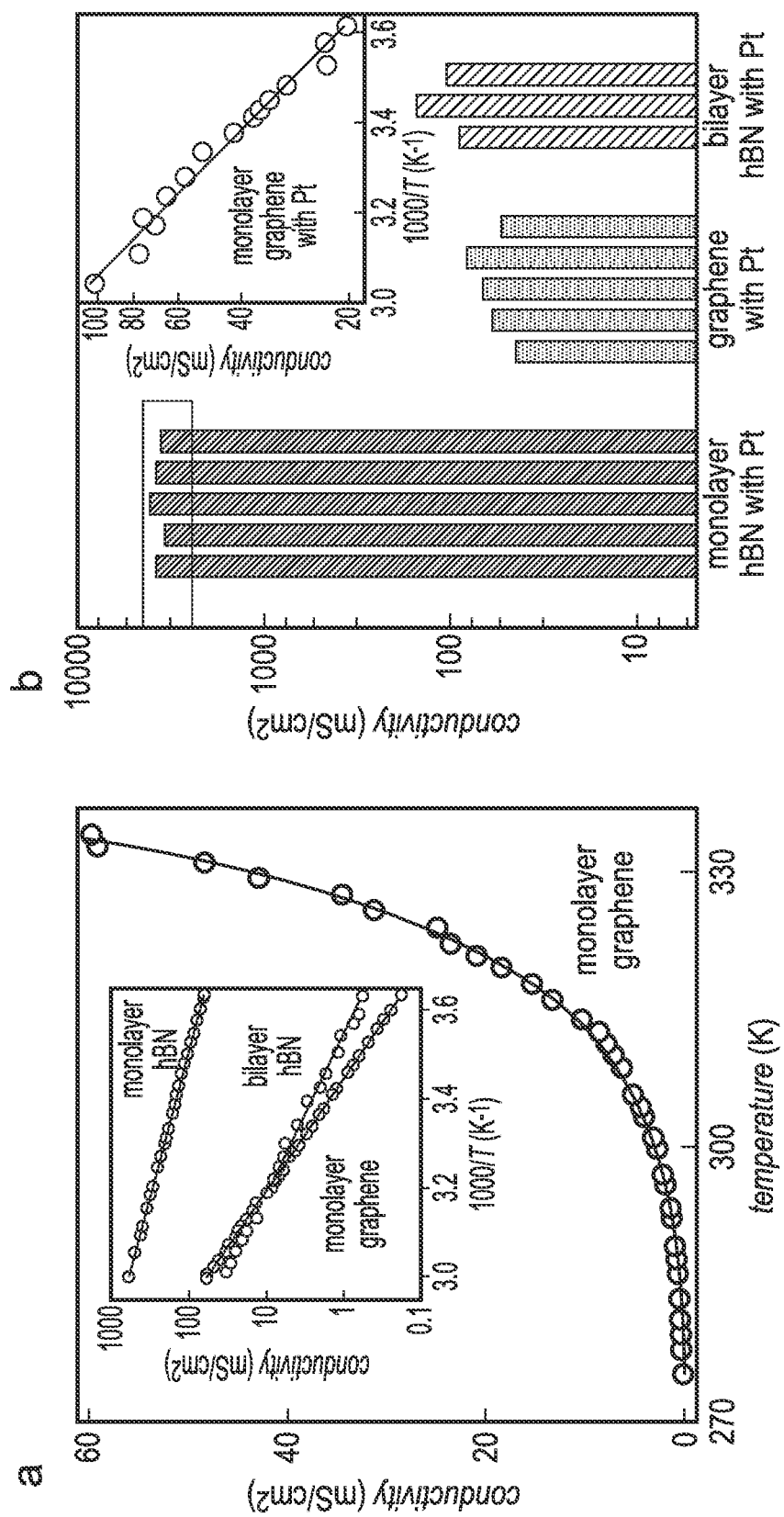

As illustrated in the left inset of FIG. 1a, 2D crystals effectively serve as atomically thin barriers between two Nafion® spaces. For electrical measurements, samples were placed in a hydrogen-argon atmosphere at 100% humidity, which ensured high conductivity of Nafion® films. Examples of I-V characteristics measured for devices incorporating monolayers of graphene, hBN and MoS2 are shown in FIG. 1a. This behavior is highly reproducible, as illustrated by statistics in FIG. 1b for a number of different membranes. The measured proton current I is found to vary linearly with bias V, and the conductance S=I/V to be proportional to the membrane area A (see FIGS. 6-8). For devices prepared in the same manner but without a 2D membrane ('bare hole'), S was about 50 times higher than in the presence of monolayer hBN (FIG. 6). This ensures that the measured areal conductivity σ=S/A is dominated by the 2D crystals and that Nafion® gives rise only to a relatively small series resistance. In the opposite limit of thick barriers (e.g., a few nm thick graphite or thick metal or dielectric films evaporated between the Nafion® spaces), we find a parasitic parallel conductance of about 10 pS, which could be traced back to leakage currents along $SiN_x$ surfaces in high humidity. Within this accuracy, we could not detect any proton current through monolayer $MoS_2$, bilayer graphene, tetra-layer hBN or thicker 2D crystals.

The difference in permeation through different 2D crystals can qualitatively be understood if we consider the electron clouds that have to be overcome by passing protons. One can see from the insets of FIG. 1b that monolayer hBN is more 'porous' than graphene, reflecting the fact that the boron nitride bond is strongly polarized with valence electrons concentrated around nitrogen atoms. For MoS2, the cloud is much denser because of the larger atoms involved (FIG. 11). The absence of detectable a for bilayer graphene can be attributed to its AB stacking such that 'pores' in the electron cloud in one layer are covered by density maxima within the other layer. In contrast, hBN crystals exhibit the AA' stacking, which leads to an increase in the integrated electron density with increasing number of layers but allows the central pore in the cloud to persist even for multilayer hBN membranes.

It is instructive to emphasize that there is no correlation between proton and electron transport through 2D crystals. Indeed, hBN exhibits the highest proton conductivity but is a wide gap insulator with the highest tunnel barrier. In contrast, monolayer $MoS_2$ that shows no discernable proton permeation is a heavily doped semiconductor with electron-type conductivity. Furthermore, numerous studies using transmission and tunneling microscopy and other techniques have so far failed to find even individual pinholes (atomic-scale defects) in graphene and hBN prepared using the same cleavage technique as employed in the present work. In contrast, MoS2 monolayers contain a high density of sulfur vacancies but nonetheless exhibit little proton conductivity. These observations combined with the high reproducibility of our measurements for different devices, the linear scaling with A and the consistent behavior with increasing the number of layers assure that the reported a represent the intrinsic proton properties of the studied membranes.

To determine the barrier heights E presented by graphene and hBN, we have measured T dependences of their a (FIG. 2a) which are found to exhibit the Arrhenius-type behavior, exp(-ElkBT). Note that conductivity of Nafion® not only contributes little to the overall value of S but also changes only by a factor of about 1.5 for the same T range (FIG. 8). The activation behavior yields E=0.78±0.03, 0.61±0.04 and 0.3±0.02 eV for graphene, bilayer hBN and monolayer hBN, respectively. The proton barrier for graphene is notably lower than the values of 1.2-2.2 eV, which were found using ab initio molecular dynamics simulations and the climbing image nudged elastic band method. We have reproduced those calculations for graphene and extended them onto monolayer hBN as discussed later below. Our results yield E=1.25-1.40 for graphene, and eV for monolayer hBN. The disagreement between the experiment and theory in the absolute value of E is perhaps not surprising given the complex nature of possible pathways and sensitivity of the calculations to pseudopotentials, the exchange-correlation function etc. Alternatively, the difference can arise due to the fact that protons in Nafion®/water move along hydrogen bonds rather than in vacuum as the theory has assumed so far.

For certain applications, it is desirable to achieve the highest possible proton conductivity. For example, hydrogen fuel cells require membranes with about >1 S per $cm^2$. This condition is satisfied by monolayers of hBN and graphene above 80 and 110° C., respectively (inset of FIG. 2a). Moreover, graphene remains stable in oxygen and humid atmosphere up to 400° C., and the extrapolation of our results to 'very safe' 250° C. yields extremely high $\sigma > 10^3$ $S/cm^2$. Furthermore, noticing that platinum group metals have a high affinity for hydrogen, we have investigated their influence on proton transport through 2D crystals. To this end, a discontinuous layer of Pt or Pd (nominally, 1-2 nm thick) was evaporated onto one of the surfaces of 2D crystals. FIG. 2b shows that the added catalytic layer leads to a significant increase in a. For monolayer hBN, the measured S becomes indistinguishable from that of reference 'bare hole' devices (FIG. 2b). This shows that our measurements become limited by Nafion®'s series resistance and Pt-activated monolayer hBN is no longer a bottleneck for proton permeation. On the other hand, for graphene and bilayer hBN activated with Pt, the series resistance remains relatively small and the measurements still reflect their intrinsic properties. By studying σ(T), we find that Pt reduces the activation energy E by as much as about 0.5 eV to about 0.24 eV (FIG. 2b). Our simulations of the catalytic effect yield a reduction in E by about 0.65 eV, in qualitative agreement with the experiment. The mechanism behind this barrier reduction can be attributed to attraction of passing protons to Pt (FIG. 10). Note that the measurements in FIG. 2b set only a lower limit of ≈3 $S/cm^2$ on room-T conductivity of catalytically-activated monolayer hBN and, if the membranes experience qualitatively similar reduction in E as observed for graphene, we expect essentially barrier-less proton transport. It would require membranes with much larger area to determine intrinsic a for catalytically-activated hBN.

Figure 3:
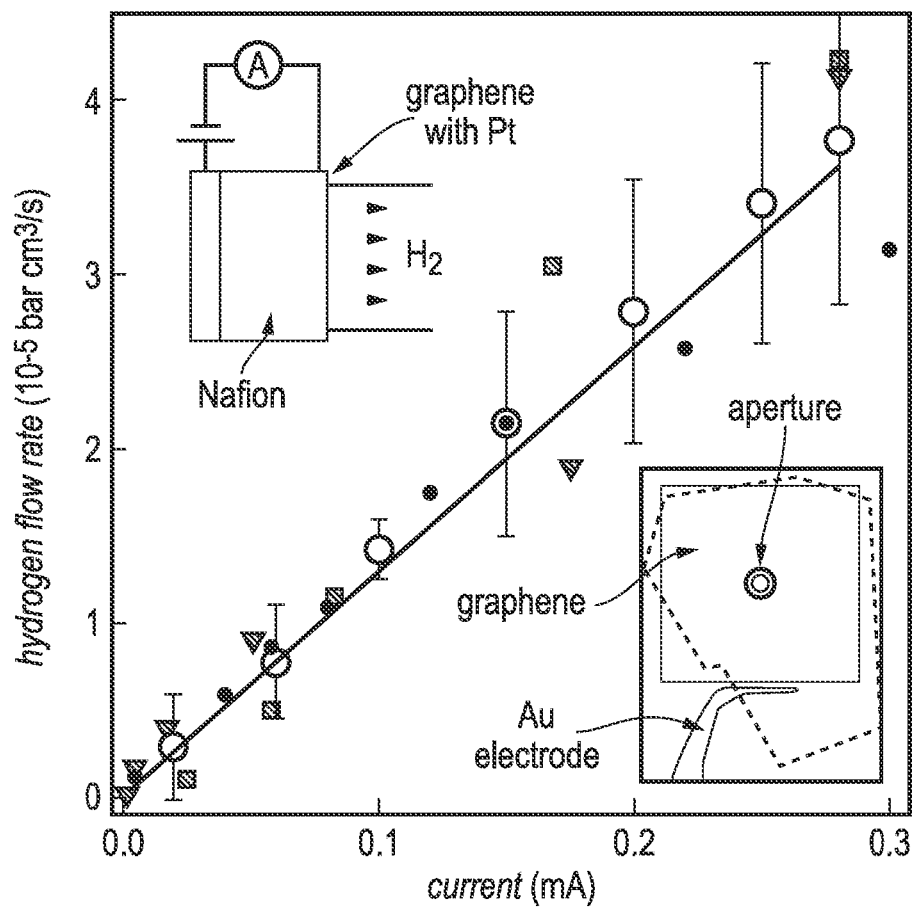

Finally, we demonstrate directly that the observed electric currents are due to proton flux through the 2D membranes. To this end, we have prepared devices such as shown in the insets of FIG. 3. Here, one of the Nafion®/$PdH_x$ electrodes is removed, and the graphene surface decorated with Pt faces a vacuum chamber equipped with a mass spectrometer. If no bias is applied between graphene and the remaining $PdH_x$ electrode, we cannot detect any gas leak (including He) between the hydrogen and vacuum chambers. Similarly, no gas flow could be detected for positive bias on graphene. However, by applying a negative bias we have measured a steady H2 flux into the vacuum chamber. Its value is determined by the number of protons, Iie, passing through the membrane per second. Using the ideal gas law, one can easily derive the relation F=kBT(II2e) where the flow rate F is the value measured by the mass spectrometer tuned to molecular hydrogen. The latter dependence is shown in FIG. 3 by the solid red line, in excellent agreement with the experiment.

It can be seen from the above that monolayers of graphene, hBN and similar 2D materials can under appropriate conditions represent a new class of proton conductors. This conductivity can be controlled. The 2D proton conductors of the present invention will find use in various hydrogen technologies. For example, 2D crystals can be considered as proton membranes for fuel cells. They are highly conductive to protons and chemically and thermally stable and, at the same time, impermeable to H2, water or methanol. This could be exploited to solve the problem of fuel crossover and poisoning in existing fuel cells. The demonstrated current-controlled source of hydrogen is also appealing at least for its simplicity and, as large-area graphene and hBN films are becoming commercially available, the scheme may be used to harvest hydrogen from gas mixtures or air.

Example 1 Production of a 2D Proton Conductor

Figure 4:
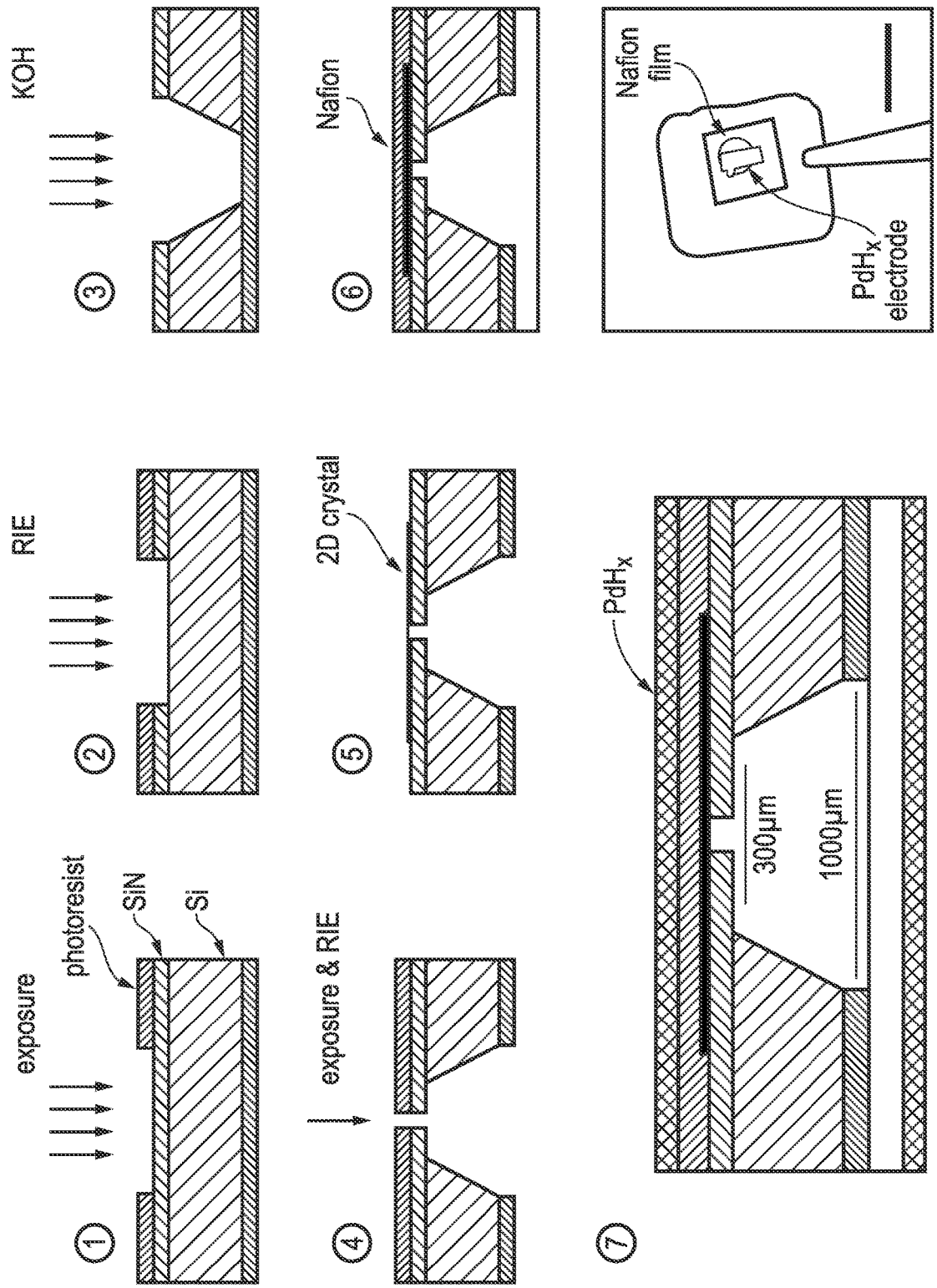

FIG. 4 explains the microfabrication procedures. We start with preparing free-standing silicon nitride ($SiN_x$) membranes from commercially available Si wafers coated from both sides with 500 nm of $SiN_x$. An etch mask is made by photolithography. Reactive ion etching (RIE) is employed to remove a 1×1 $mm^2$ section from one of the $SiN_x$ layers (steps 1&2 in FIG. 4). The Si wafer underneath is etched away by wet chemistry by exposing the wafer to a KOH solution that etches away Si and leaves a free-standing $SiN_x$ membrane of typically 300×300 $\mu m^2$ in size (step 3). During step 4, a circular hole is drilled by RIE through the $SiN_x$ membrane using the same procedures as in steps 1&2. Next, a 2D crystal (graphene, hBN or MoS2) is prepared by standard micromechanical exfoliation and transferred on top of the membrane using either the wet or dry technique to cover the aperture in $SiN_x$ (step 5).

Figure 5:
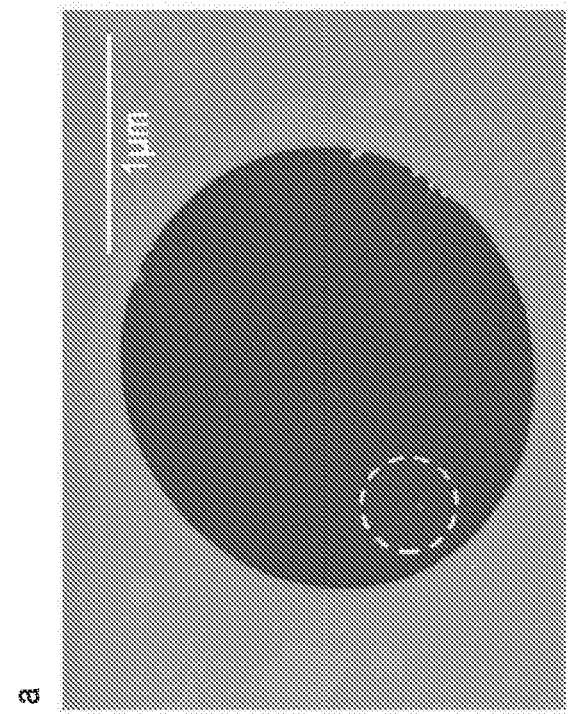
FIG. 5 shows: SEM images of suspended 2D membranes.
Figure 5:
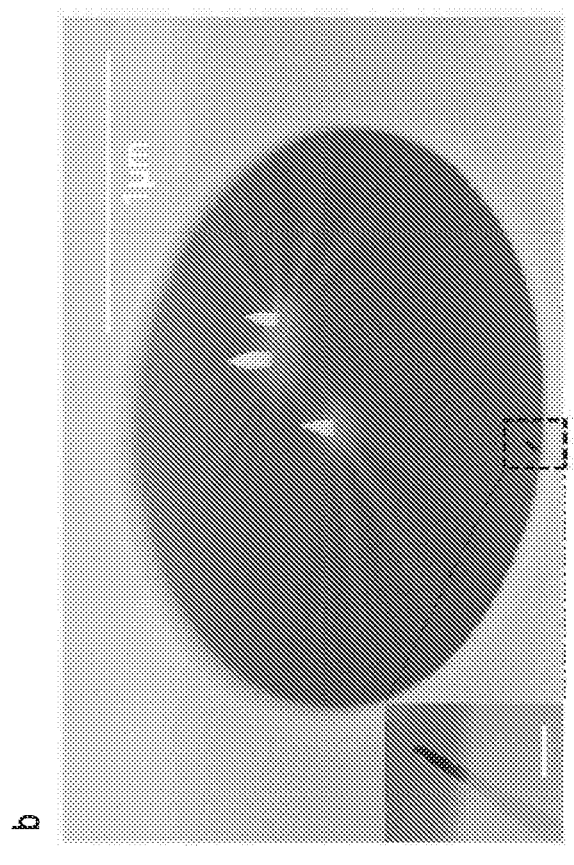

After step 5, the suspended membranes could be examined for their integrity and quality in a scanning electron microscope (SEM). Pristine 2D crystals give little SEM contrast, and it requires some contamination to notice 2D membranes on top of the holes. Contamination can be accidental as in the case of FIG. 5*a* or induced by the electron beam (FIG. 5*b*). If cracks or tears are present, they are clearly seen as darker areas (inset of FIG. 5*b*).

The fabrication of devices for electrical measurements continues with depositing a proton-conducting polymer layer. A Nafion® 117 solution (5%) is drop-cast or spin-coated on both sides of a suspended 2D membrane (step 6 in FIG. 4). Finally, palladium hydride ($PdH_x$) electrodes are mechanically attached to the Nafion® layers. To synthesize such electrodes, a 25 μm thick Pd foil is left overnight in a saturated hydrogen-donating solution following the recipe reported in D W Murphy et al, Chem Mater, 5, 767-769, (1993). This leads to atomic hydrogen being absorbed into the crystal lattice of Pd turning it into $PdH_x$. The resulting devices are placed in a water saturated environment at 130° C. to crosslink the polymer and improve electrical contacts.

The described experimental design is optimized to take into account the following considerations. First, electric currents in Nafion® are known to be carried exclusively by protons that hop between immobile sulfonate groups and Nafion® is not conductive for electrons. This can be evidenced directly by, for example, inserting a gold film across a Nafion® conductor, which then breaks down the electrical connectivity. Accordingly, protons are the only mobile species that can pass between the transition metal hydride e.g. $PdH_x$ electrodes. $PdH_x$ is used as a proton injecting material that converts an electron flow into a proton one by the following process: $PdH_x \rightarrow Pd + xH^+ + xe^-$. This property, combined with the large area of our electrodes, relative to the membrane area A makes the contact resistance between Nafion® and $PdH_x$ negligible so that the circuit conductance in our experiments is limited by either 2D crystals or, in their absence, by the Nafion® constriction of diameter D.

For the catalytically-activated measurements, 1-2 nm of Pt were deposited by e-beam evaporation directly onto the suspended membrane to form a discontinuous film prior to the Nafion® coating. Thicker, continuous films were found to block proton currents, which could be witnessed as numerous hydrogen bubbles that appeared under Pt after passing electric current. Typically, our Pt films resulted in about 80% area coverage, which reduced the effective area for proton transport accordingly, as found by depositing such films between Nafion® spaces but without 2D membranes (see below). Pd films were found to be less blocking and continuous films up to 10 nm in thickness did not significantly impede the proton flow. Otherwise, both Pd and Pt films resulted in similar enhancement of proton transport through 2D crystals.

Electrical Measurements of a 2D Proton Conductor

The devices described above were placed inside a chamber filled with a forming gas (10% H2 in argon) and containing some liquid water to provide 100% relative humidity. I-V curves were recorded by using DC measurements. We varied voltage in a range of typically up to 1 V at sweep rates up to 0.5 V/min. Under these conditions, the curves were non-hysteretic and highly reproducible. The devices were stable for many weeks if not allowed to dry out.

To characterize our experimental setup, we first measured leakage currents in the absence of a proton conductive path. To this end, two metallic contacts were placed onto the opposite surfaces of a piece of a fresh $Si/SiN_x$ wafer and I-V characteristics were measured under the same humid conditions. Conductance of the order of about 5 pS was normally registered. We also used fully processed devices and then mechanically removed the Nafion® film and electrodes. In the latter case, the parasitic conductance was slightly (by a factor of 2) higher, which is probably due to a residue left of $SiN_x$ surfaces during processing. In principle, it would be possible to reduce the leakage currents by using, for example, separate chambers at the opposite sides of the Si wafer but the observed parasitic conductance was deemed small enough for the purpose of the present work.

As a reference, we studied conductivity of 'bare-hole' devices that were prepared in exactly the same manner as our membrane devices but without depositing a 2D crystal to cover the aperture (step 5 in FIG. 4 is omitted). FIG. 6 shows conductance of such devices as a function of their diameter D. Within the experimental scatter, conductance S increases linearly with D, in agreement with Maxwell's formula: $S = \sigma ND$. The latter is derived by solving Laplace's equation for two semi-spaces that have conductivity σ and are connected by a hole with D much larger than the length d of the opening. In our case, d=500 nm and the condition is comfortably satisfied, except for possibly the smallest membranes in FIG. 6 with D=2 μm.

From the dependence shown in FIG. 6, we can estimate conductivity of our Nafion® films as 1 mS/cm. As discussed above, Nafion®'s conductivity did not limit our measurements of proton transport through 2D crystals, except for the case of catalytically-activated monolayer hBN. Nonetheless, we note that the found σN is two orders of magnitude smaller than values achievable for highest-quality Nafion®. There are two reasons for this. First, solution-cast Nafion® is known to lose typically one order of magnitude in conductivity. Second, Nafion® is normally pretreated by boiling in $H_2O_2$ and $H_2SO_4$ for several hours. If the latter procedure was used, our Nafion® films indeed increased their conductivity by a factor of 10, reaching the standard values for solution-cast Nafion® of about 10 mS/cm. Unfortunately, this harsh treatment could not be applied to our membrane devices that became destroyed with Nafion® films delaminating from $SiN_x$.

For consistency, most of the 2D membranes reported in the main text were made 2 μm in diameter. However, we also studied many other membranes with diameters ranging from 1 to 50 μm. We found that their conductance scaled linearly with the aperture area A. FIG. 7 shows this for 10 monolayer hBN devices with D between 1 and 4 μm. Within the typical experimental scatter for devices with the same D, the conductance increases linearly with the area A of 2D membranes, in agreement with general expectations. The same scaling was also observed for graphene membranes.

As discussed above, the proton conductivity of catalytically-activated monolayer hBN is so high that the series resistance of Nafion® becomes the limiting factor in our measurements. This is further evidenced by comparing T dependences of different devices in which Nafion® was the limiting factor. Those include 'bare-hole' devices (Nafion® only), 'bare-hole' devices with Pt (Nafion®/Pt/Nafion®) and monolayer hBN membranes activated with Pt.

FIG. 8 shows a typical behavior of their conductance as a function of T. Consistent with the small activation energy for proton transport in Nafion® (<0.02 eV), we found that temperature effects in all the above devices are small over the entire temperature range (see FIG. 8). The nonmonotonic T dependence for the devices with Pt layers (FIG. 8) remains to be understood but we note that Nafion® often exhibits similar nonmonotonic behavior at higher T, beyond the range of FIG. 8. We speculate that the Pt activation shifts this peak to lower T. Importantly for our experiments, the influence of Pt nanoparticles on local conductivity in the Nafion® constriction is approximately the same independently of whether an hBN membrane is present or not. This further indicates that the proton conductivity of Pt-activated hBN is so high that it becomes unmeasurable in our experimental setup, essentially because of the limited size of currently available hBN crystals.

Absence of Atomic Scale Defects in 2D Proton Conductors

Visual inspection of membranes in SEM can reliably rule out holes and cracks with sizes down to <10 nm (see FIG. 5b). None of these types of defects were observed in the 2D proton conductors of the invention which were examined using SEM. Occasional cracks such as in FIG. 5b could only be observed if introduced deliberately or a profound mistake was made during handling procedures.

We verified the integrity of the 2D proton conductors of the invention using Raman spectroscopy because this is known to be extremely sensitive to atomic-scale defects in graphene. The intensity of the D peak provides a good estimate for a concentration of such defects, which could be not only vacancies or larger holes but also adatoms that do not lead to pinholes. We could not discern any D peak in our graphene membranes. This sets an upper limit on the atomic defect density of about $10^8$ cm$^{-2}$ or one defect per μm$^2$.

Furthermore, such a low density of defects in graphene is in stark contrast with a high density (about $10^{13}$ cm$^{-2}$) of sulfur vacancies found in mechanically cleaved MoS2. Notwithstanding this fact, no proton current could be detected through our MoS2 membranes. If we assume each vacancy provides a hole of about 1 Å in size, the expected approximately $10^5$ vacancies present in our typical MoS2 membranes would provide an effective opening of about 30 nm in diameter. Using the results of FIG. 6, this is expected to lead to a conductance of about 3 nS, that is, >100 times larger than the limit set by our measurements on proton conductance through monolayer MoS2. This shows that individual vacancies in fact provide much smaller proton conductivity than their classical diameter suggests.

To strengthen the above arguments further, we tried to rule out even individual vacancies from our proton conductive (graphene and hBN) membranes. The most sensitive technique known to detect pinholes is arguably measurements of gas leakage from small pressurized volumes. To this end, a microcavity of typically about 1 μm$^3$ in size is etched in a Si/SiO2 wafer, sealed with graphene or hBN and then pressurized. If the pressure inside the microcavity is higher than outside, the membrane bulges upwards; if it is lower, downwards. Changes in pressure can be monitored by measuring the height of the bulge as a function of time using atomic force microscopy (AFM). If there are no holes in the membrane, the gas leaks slowly through the oxide layer, and it typically takes many hours until the pressure inside and outside the microcavity equalize. However, the presence of even a single atomicscale hole through which atoms can effuse allows the pressure to equalize in less than one second. We prepared microcavities in a Si/SiO2 wafer and sealed them with monolayer graphene. The microcavities were placed inside a chamber filled with Ar at 200 kPa for typically 4 days to gradually pressurize them. After taking the devices out, the membranes were found to bulge upwards. FIG. 9 shows the deflation of such microballoons with time. The Ar leak rates were found to be about $10^3$ atoms per second. If an atomic scale hole is introduced by, for example, ultraviolet chemical etching, the leak rate increases by many orders of magnitude, leading to practically instantaneous deflation. Furthermore, we found no difference in the deflation rates for membranes with and without evaporated Pt. In principle, it could be argued that membranes with pinholes smaller than the kinetic diameter of Ar (0.34 nm) or pinholes blocked with Pt nanoparticles should show no detectable leaks. However, monolayer membranes with sub-nanometer-sized pinholes are known to be rather unstable mechanically due to a tendency of defects to enlarge under strain, which for the applied pressures reached significant values of about 1%. Our micro-balloons remained stable and could be pressurized many times. This behavior confirmed that no individual pinholes were present in graphene and monolayer hBN obtained by mechanical cleavage when preparing the 2D proton conductors of the invention. This confirms that the proton conductance does not proceed via transmission through defects.

Detection of proton flow in the 2D proton conductors by mass spectrometry

To show directly that the electric current through our 2D proton conductors is carried by protons, we used the apparatus shown in detail in FIG. 10a. Protons transferring through graphene are collected at a catalyst Pt layer where they recombine to form molecular hydrogen: $2H^+ + 2e^- \rightarrow H_2$. The hydrogen flux is then measured with a mass spectrometer. Because the electric current I is defined by the number of protons passing through the graphene membrane, the hydrogen flow F is directly related to the passing current I.

For this particular experiment, the 2D proton conducting membranes of the invention were made as large as possible (50 μm in diameter) to increase the hydrogen flux to such values that they could be detectable with a mass spectrometer (Inficon UL200). To collect the electric current at the graphene membrane, a metallic contact (100 nm Au/5 nm Cr) was fabricated next to the SiN$_x$ aperture, before transferring graphene on top to cover both aperture and contact. This side of the Si wafer (with graphene on top) was then decorated with 1-2 nm of Pt to increase the proton flux and allow its easier conversion into hydrogen. The opposite face of the graphene membrane was covered with Nafion® and connected to a PdH$_x$ electrode in the same way as previously described.

The resulting device on the Si wafer was glued with epoxy to a perforated Cu foil that was clamped between two O-rings to separate two chambers: one filled with a gas and the other connected to the mass spectrometer. The setup was checked by filling the gas chamber with helium at the atmospheric pressure. No He leak could be detected above background readings of the spectrometer at about $10^{-8}$ bar cm$^3$/s. Then, the chamber was filled with our standard gas mixture (10% H2 in argon at 1 bar and at 100% humidity). No hydrogen flux could be detected without applying negative bias to graphene.

However, by applying such a bias a controllable flow of H2 at a level of about $10^{-5}$ bar cm$^3$/s was readily detected (see FIG. 10b). This figure shows the hydrogen flow rates F as a function of time for one of our devices using negative biases from 0 to 20 V. When cycling back from 20 to 0 V, the curves retraced themselves, indicating that the membrane was undamaged during the measurements. This is a feature that will be important for applications such as in hydrogen fuel cells.

Atomic hydrogen is highly unstable with respect to its molecular form, and it is most likely that the conversion into molecular hydrogen takes places at the surface of Pt rather than in the vacuum chamber. Accordingly, the Pt layer has to be discontinuous to let hydrogen escape. For continuous coverage (>5 nm of Pt), we observed formation of small hydrogen bubbles that grew with increasing electric charge passed through the circuit. The largest bubbles eventually erupted.

It is also instructive to mention the case of continuous Au films evaporated on top of the above devices (already containing a discontinuous Pt layer). We found that a bias applied across such devices again resulted in the formation of bubbles at the interface between graphene and the metal film. The bubbles could burst and sometimes even damage the membrane. This disallowed the use of continuous metal films for the mass spectrometry experiment. The same bubbling effect was observed for hBN membranes covered with a Pt film that provided the continuity of the electrical circuit for insulating hBN.

These observations serve as yet another indication of proton transfer through graphene and hBN membranes. On the other hand, no bubbles could be observed for thicker 2D crystals that again shows their impermeability to protons.

Theoretical Analysis of Proton Transport Through 2D Crystals

It is possible to understand our results qualitatively by considering the electron clouds created by different 2D crystals. These clouds impede the passage of protons through 2D membranes. In addition to the plots of the electron density for graphene and hBN monolayers in FIG. 1$b$, FIG. 11 shows similar plots of these clouds with superimposed positions of C, B and N atoms using the ball-and-stick model of graphene and hBN crystal lattices. In addition, FIG. 11 plots the electron density for monolayer $MoS_2$. One can immediately see that the latter cloud is much denser than those of monolayer hBN and graphene, which explains the absence of proton transport through MoS2 monolayers.

For quantitative analysis, we first note that proton permeation through graphene has previously been studied using both ab initio molecular dynamics simulations (AIMD) and the climbing image nudged elastic band method (CI-NEB) (see S. P. Koenig, L. Wang, J. Pellegrino, J. S. Bunch. Selective molecular sieving through porous graphene. Nat. Nanotechnol. 7, 728-732 (2012); W. L. Wang, E. Kaxiras. Graphene hydrate: Theoretical prediction of a new insulating form of graphene. New J. Phys. 12, 125012 (2010); and M. Miao, M. B. Nardelli, Q. Wang, Y. Liu. First principles study of the permeability of graphene to hydrogen atoms. Phys. Chem. Chem. Phys. 15, 16132-16137 (2013). These studies have provided estimates for the proton transport barrier E in graphene ranging from about 1.17 eV to 2.21 eV. We reproduced those results for the case of graphene and extended them onto monolayer hBN.

All our simulations were performed using the CP2K package with the Pade exchange-correlation functional form based on literature methods (see: L. Tsetserisa, S. T. Pantelides. Graphene: An impermeable or selectively permeable membrane for atomic species? Carbon 67, 58-63 (2014); and J. VandeVondele, M. Krack, F. Mohamed, M. Parrinello, T. Chassaing, J. Hutter. Quickstep: Fast and accurate density functional calculations using a mixed Gaussian and plane waves approach. Comput. Phys. Commun. 167, 103-128 (2005)). The barrier was estimated as the minimum kinetic energy necessary for proton transfer. The simulations have yielded graphene's E between 1.30 eV and 1.40 eV.

We calculated the energy for various configurations (usually referred to as 'images'), which correspond to different distances between a proton and a 2D membrane to provide a series of images for a proton approaching the membrane. The energy was then minimized over obtained images and plotted as a function of distance to 2D crystals. The barrier E was estimated using the differential height of energy profiles. FIG. 12 shows examples of such energy profiles for graphene and monolayer hBN. We have estimated the proton barrier as 1.26 eV and 0.68 eV for graphene and monolayer hBN, respectively.

We modelled the effect of Pt on proton transport in the same way. The addition of the Pt atoms resulted in a significant reduction of the barrier in graphene to about 0.6 eV; that is, by a factor of 2. The absolute value of the reduction in the barrier height is in good agreement with the experimental observations.

Proton Transport Through 2D Crystals in Liquids

Although Nafion® was the material of choice in this work due to its stability and convenience of handling, in order to show the generality of our results, we have also investigated proton conductivity of 2D crystals when they were immersed in water solutions. This also shows that the devices of the invention will work in a liquid environment such as that found in some fuel cells and electrochemical cells.

For these experiments, devices were fabricated in the same way as described previously but instead of covering 2D crystals with Nafion®, they separated two reservoirs containing liquid electrolytes (HCl solutions). A polydimethylsiloxane seal was used to minimize leakage along the 2D crystal/substrate interface (FIG. 14 inset; yellow). Ag/AgCl electrodes were placed in each reservoir to apply a bias across the membranes and measure ionic currents (FIG. 14).

Typical I-V profiles of single-, bi-, and tri-layers hBN are presented in FIG. 14$a$. This behavior was highly reproducible as evidenced by the statistics in FIG. 14$b$. For devices prepared in the same manner but without a 2D crystal, the conductivity S was >$10^4$ times higher than in the presence of monolayer hBN, which ensured that the 2D crystals limited the proton current. As in the case of Nafion®, we found a parasitic parallel conductance but it was somewhat higher (about 20 pS) for the liquid cell setup. Within this accuracy, we could not detect any proton current through monolayer $MoS_2$, bilayer graphene, trilayer hBN or any thicker 2D crystals. Most importantly, the measured proton conductivities using electrolytes agree extremely well with the values found using Nafion® as the proton conducting membrane.

We have shown that 2D proton conducting membranes can be produced from monolayers of graphene and hexagonal boron nitride (hBN) which are unexpectedly permeable to thermal protons. We have also shown that the proton barriers can be further reduced by decorating monolayers of 2D materials, including but not limited to graphene and hBN, with catalytic nanoparticles. Thus other 2D materials can also be rendered proton conducting in accordance with the invention when suitably treated with catalytic metals. The atomically thin proton conductors of the invention are expected to be of interest for many hydrogen-based technologies.

The invention claimed is:

1. A proton conducting membrane comprising: monolithic, continuous layer of a two-dimensional (2D) material formed from a single crystal, wherein the 2D material is selected from the group consisting of monolayer graphene and monolayer and bilayer hexagonal boron nitride (hBN); and an ionomer coating provided on at least one side of the single piece of the 2D material; characterized in that said single piece of the 2D material has a discontinuous coating of a catalytic metal selected from Groups 8 to 10 of the periodic table.

2. The membrane as claimed in claim 1, wherein the ionomer is a proton conducting polymer.

3. The membrane as claimed in claim 2, wherein the polymer is a sulfonated polymer.

4. The membrane as claimed in claim 1, wherein the ionomer is provided on one side of the 2D material, or alternatively, is provided on both sides of the 2D material.

5. The membrane as claimed in claim 1, further including a substrate.

6. The membrane as claimed in claim 5, wherein the ionomer and substrate are provided as a single entity.

7. The membrane as claimed in claim 1, wherein the 2D material is monolayer graphene.

8. The membrane as claimed in claim 1, wherein the 2D material is monolayer or bilayer hBN.

9. A method of separating protons from other materials, the method comprising:

allowing the protons to pass through the membrane of claim 1.

10. The method of claim 9, wherein a proton concentration gradient exists between different sides of the 2D material.

11. The method of claim 9, wherein an electrical potential is applied across the membrane.

12. A process for preparing the proton-conducting membrane of claim 1, said process comprising the following steps:

providing a monolithic, continuous layer of a two-dimensional (2D) material formed from a single crystal, wherein the 2D material is selected from the group consisting of monolayer graphene and monolayer and bilayer hBN; and either coating an ionomer on at least one side of the 2D material so that one side of the ionomer is in contact with the 2D material and the other side is exposed, or applying a layer of material comprising an ionomer and a nonconductive structural component to one side of the 2D material;

characterized in that the process further comprises applying a discontinuous coating of a catalytic metal to the 2D material, wherein the catalytic metal is selected from Groups 8 to 10 of the periodic table.

13. The membrane of claim 3, wherein the sulfonated polymer is Nafion®.

14. The membrane of claim 1, further comprising a substrate.

15. The process of claim 12, further comprising the step of providing a substrate in contact with an exposed side of the at least one ionomer coating.

* * * * *